US009343907B2

(12) United States Patent
Takahashi et al.

(10) Patent No.: US 9,343,907 B2
(45) Date of Patent: May 17, 2016

(54) ENERGY ASSIST SYSTEM SELECTION SUPPORTING APPARATUS, CAPACITY SELECTING APPARATUS, POWER CONSUMPTION CALCULATING APPARATUS, AND LAYOUT GENERATING APPARATUS

(71) Applicant: Mitsubishi Electric Corporation, Chiyoda-ku, Tokyo (JP)

(72) Inventors: Yo Takahashi, Tokyo (JP); Tetsuya Okuda, Tokyo (JP); Yoshinori Kanda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 432 days.

(21) Appl. No.: 14/110,190

(22) PCT Filed: Jan. 11, 2013

(86) PCT No.: PCT/JP2013/050459
§ 371 (c)(1),
(2) Date: Oct. 7, 2013

(87) PCT Pub. No.: WO2014/109057
PCT Pub. Date: Jul. 17, 2014

(65) Prior Publication Data
US 2014/0200727 A1   Jul. 17, 2014

(51) Int. Cl.
G05B 17/02 (2006.01)
H02J 4/00 (2006.01)
(Continued)

(52) U.S. Cl.
CPC . *H02J 4/00* (2013.01); *G05B 15/02* (2013.01); *G06F 17/50* (2013.01); *G05B 17/02* (2013.01); *G06F 2217/78* (2013.01)

(58) Field of Classification Search
USPC ......................................................... 700/295
See application file for complete search history.

(56) References Cited

U.S. PATENT DOCUMENTS

2007/0120217 A1   5/2007   Otremba
2010/0228697 A1*  9/2010   Komiya ................. G06Q 10/00
                                                    706/54

FOREIGN PATENT DOCUMENTS

CN          101878589 A    11/2010
DE     102005049978 A1     4/2007
(Continued)

OTHER PUBLICATIONS

International Search Report for PCT/JP2013/050459 dated Apr. 9, 2013.
(Continued)

*Primary Examiner* — Mohammad Ali
*Assistant Examiner* — Sheela S Rao
(74) *Attorney, Agent, or Firm* — Sughrue Mion, PLLC; Richard C. Turner

(57) ABSTRACT

An energy assist system selection supporting apparatus equipped with a step-up/step-down chopper unit, an electricity storage unit, and an electric motor configured to drive a machine includes an operation-pattern generating section for generating an operation pattern taking into account an electronic machine configuration, a load-pattern generating section for generating a load pattern concerning power consumption according to the generated operation pattern, a data processing section for evaluating, according to the generated load pattern, a characteristic of the energy assist system applied with the generated operation pattern while comparing the characteristic with a limit value and generate, according to an evaluation result, configuration information including the number of each unit of the energy assist system, and a layout section configured to lay out and arrange the units on a virtual space and display the units on a display screen according to the generated configuration information.

8 Claims, 13 Drawing Sheets

(51) Int. Cl.
*G06F 17/50* (2006.01)
*G05B 15/02* (2006.01)

(56) References Cited

FOREIGN PATENT DOCUMENTS

| DE | 102006059829 A1 | 6/2008 |
|---|---|---|
| JP | 6-233574 A | 8/1994 |
| JP | 8-123847 A | 5/1996 |
| JP | 2000-322457 A | 11/2000 |
| JP | 2003-99479 A | 4/2003 |
| JP | 2004-343925 A | 12/2004 |
| JP | 2006-42589 A | 2/2006 |
| JP | 2007-29326 A | 2/2007 |
| JP | 2008-40591 A | 2/2008 |
| JP | 2008-52417 A | 3/2008 |
| JP | 2008-52695 A | 3/2008 |
| JP | 2010-187464 A | 8/2010 |
| JP | 2011-166953 A | 8/2011 |
| WO | 2008/139800 A1 | 11/2008 |

OTHER PUBLICATIONS

Communication dated Oct. 10, 2014 from The German Patent Office in counterpart German Patent Application No. 112013000106.3.
Communication dated Oct. 20, 2015 from the German Patent and Trademark Office in counterpart application No. 112013000106.3.
Wikipedia: Parallelschaltung. Version of Dec. 10, 2012, URL: https://de.wikipedia.org/w/index.php?title=Parallelschaltung&oldid=111524112 [searched on Oct. 29, 2015] (6 pages total).
Communication dated Apr. 1, 2015, issued by the State Intellectual Property Office of P.R. China in counterpart Chinese application No. 201380001280.1.

* cited by examiner

| | | |
|---|---|---|
| TABLE MASS | WT | Kg |
| LOAD MASS | WL | Kg |
| LOAD RESISTANCE FORCE | Fc | N |
| FASTENING FORCE OF TABLE GUIDE SURFACE | FG | N |
| REDUCTION RATIO | 1/n | |
| REDUCTION GEAR INERTIA | JG | Kg·cm² |
| COUPLING INERTIA | JC | Kg·cm² |
| OTHER OUTPUT SHAFT CONVERTED INERTIA | JO | Kg·cm² |
| BALL SCREW LEAD | PB | Mm |
| BALL SCREW DIAMETER | DB | mm |
| BALL SCREW LENGTH | LB | mm |
| DRIVING SECTION EFFICIENCY | H | |
| COEFFICIENT OF FRICTION | μ | |

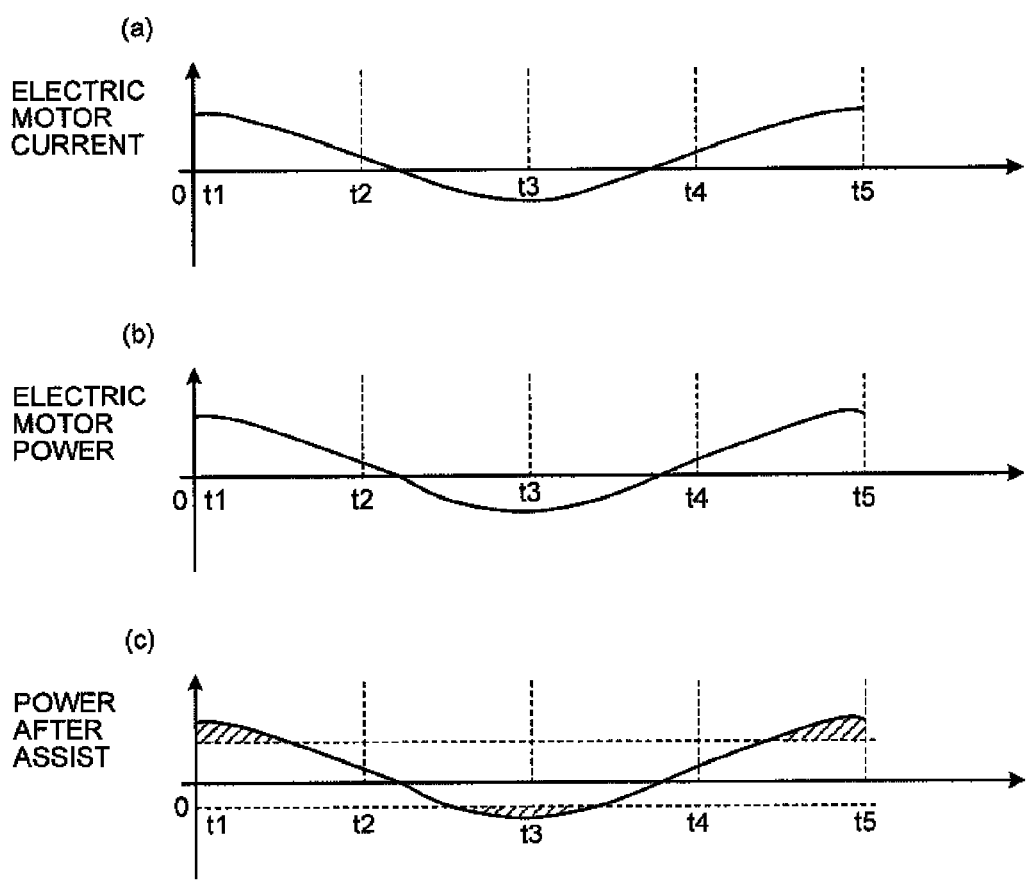

ENERGY ASSIST SYSTEM SELECTION SUPPORTING APPARATUS, CAPACITY SELECTING APPARATUS, POWER CONSUMPTION CALCULATING APPARATUS, AND LAYOUT GENERATING APPARATUS

CROSS REFERENCE TO RELATED APPLICATIONS

This application is a National Stage of International Application No. PCT/JP2013/050459 filed Jan. 11, 2013, the contents of which are incorporated herein by reference in their entirety.

FIELD

The present invention relates to an energy assist system selection supporting apparatus, a capacity selecting apparatus, a power consumption calculating apparatus, and a layout generating apparatus.

BACKGROUND

Patent Literature 1 describes that, in a design supporting apparatus for a capacitor power supply in which a plurality of capacitors are connected in series and in parallel, when load data is input and the number of parallel connections of capacitors is input, capacitor voltages at respective times of the load data are calculated, a maximum value of a rising temperature is calculated, and, when a condition change is necessary, the number of parallel connections is input anew and the same processing is repeated. Consequently, according to Patent Literature 1, it is possible to find an optimum capacitor power supply within an allowable range by repeating the processing for predetermined load data while increasing or decreasing the number of parallel connections of modules.

Patent Literature 2 describes that, in a selecting apparatus for an electric motor control apparatus, when mechanism conditions are input by combining models of various elements, command conditions such as command speed and a command position of an electric motor are input, and when specification conditions of the electric motor control apparatus are input, an electric motor control apparatus matching the mechanism conditions, the command conditions, and the specification conditions is selected out of a characteristic database of electric motor control apparatuses. Consequently, according to Patent Literature 2, because the electric motor control apparatuses can be narrowed down according to the mechanism conditions, the command conditions, and the specification conditions, it is possible to efficiently select an electric motor control apparatus.

CITATION LIST

Patent Literature

Patent Literature 1: Japanese Patent Application Laid-open No. 2008-52417
Patent Literature 2: WO 2008/139800

SUMMARY

Technical Problem

Both the technologies described in Patent Literatures 1 and 2 are based on the premise that a user side determines and inputs the number of elements used in a system. Therefore, it is necessary to repeat processing in a try and error manner until the number of elements used in the system becomes proper. Consequently, the user side is repeatedly forced to perform complicated input work and efficiency in selecting elements used in the system tends to be deteriorated.

The design supporting apparatus for a capacitor power supply described in Patent Literature 1 is considered to be an apparatus that calculates, based on an input number of parallel connections, the number of series connections of aggregates (capacitor banks) of capacitors from a load pattern. Therefore, if the design supporting apparatus for a capacitor power supply described in Patent Literature 1 is applied to selection of an energy assist system, limit values (e.g., the performance of a switching element and the performance of a reactor) due to the performance of a unit that performs control of charging and discharging of the capacitor banks are not taken into account. Therefore, it is likely that, depending on a load pattern, characteristics of the capacitor banks exceed the limit values and a normal charging and discharging operation cannot be performed.

In the selecting apparatus for an electric motor control apparatus described in Patent Literature 2, a calculation method for a load pattern is considered to be based on an operation pattern for which only a simple shaft output obtained by multiplying together torque and speed is calculated. Therefore, in the selecting apparatus for an electric motor control apparatus described in Patent Literature 2, because an electronic machine configuration is not taken into account, it is difficult to perform a simulation of an operation pattern used by a customer. That is, in the selecting apparatus for an electric motor control apparatus described in Patent Literature 2, it is difficult to calculate an operation pattern matching needs of a customer. In particular, it is difficult to efficiently perform capacity selection for an electric motor from a complicated operation pattern including an electronic machine configuration (e.g., an electronic gear and an electronic cam operation).

In the selecting apparatus for an electric motor control apparatus described in Patent Literature 2, reluctance torque peculiar to an IPM motor, in which a magnet is embedded, is not taken into account. Therefore, an accurate calculation of capacity selection for an electric motor is difficult and an accurate calculation of energy in the system is difficult. In particular, concerning a system in which an IPM motor with large power consumption and load is used, a copper loss and an error of reluctant torque are not negligible. Therefore, it is considered that a correct calculation of energy cannot be performed.

Further, in the technologies described in Patent Literatures 1 and 2, a layout in an apparatus control board and a parallel setting number limitation of units including impedances such as conductors (e.g., an electric wire and a copper plate) and capacitor banks, which a customer purchasing a product should consider, are not taken into account. Therefore, it is difficult to design a proper layout.

The present invention has been devised in view of the above and it is an object of the present invention to obtain an energy assist system selection supporting apparatus that can support selection of an energy assist system through simple and efficient processing, a capacity selecting apparatus, a power consumption calculating apparatus, and a layout generating apparatus.

Solution to Problem

In order to solve the aforementioned problems, an energy assist system selection supporting apparatus that supports selection of an energy assist system including a step-up/step-down chopper unit, an electricity storage unit, and an electric motor and configured to drive a machine, is configured in such a manner as to include: an operation-pattern generating section configured to generate an operation pattern taking into account an electronic machine configuration; a load-pattern generating section configured to generate a load pattern concerning power consumption according to the generated operation pattern; a data processing section configured to evaluate, according to the generated load pattern, a characteristic of the energy assist system applied with the generated operation pattern while comparing the characteristic with a limit value and generate, according to an evaluation result, configuration information including the number of each of the units of the energy assist system; and a layout section configured to lay out and arrange the units of the energy assist system on a virtual space and display the units on a display screen according to the generated configuration information.

Advantageous Effects of Invention

According to the present invention, the data processing section generates configuration information including the number of each of units of the energy assist system according to an evaluation result of characteristics of the energy assist system. Consequently, it is possible to easily select and present the number of each unit of the energy assist system such that the characteristics of the energy assist system are fit within allowable ranges corresponding to limit values. The layout section lays out and arranges the units of the energy assist system on a virtual space and displays the sections on a display screen according to the configuration information generated by the data processing section. Consequently, it is possible to examine a layout of the energy assist system beforehand and easily select the layout such that a layout of the units of the energy assist system fits within an allowable range corresponding to a layout limit value. Therefore, it is possible to support selection of the energy assist system through simple and efficient processing.

BRIEF DESCRIPTION OF DRAWINGS

FIG. 8 is a diagram of a selection example of an electric motor condition in the embodiment.

FIG. 9 is a diagram of a current pattern, a load pattern, and assist power in the embodiment.

DESCRIPTION OF EMBODIMENTS

An embodiment of an energy assist system selection supporting apparatus according to the present invention is explained in detail below based on the drawings. The invention is not limited by the embodiment.

Embodiment

An energy assist system selection supporting apparatus 1 according to an embodiment is explained.

The energy assist system selection supporting apparatus 1 supports selection of an energy assist system when, prior to introduction of an energy assist system, it is examined what kind of an energy assist system should be introduced.

Figure 16:
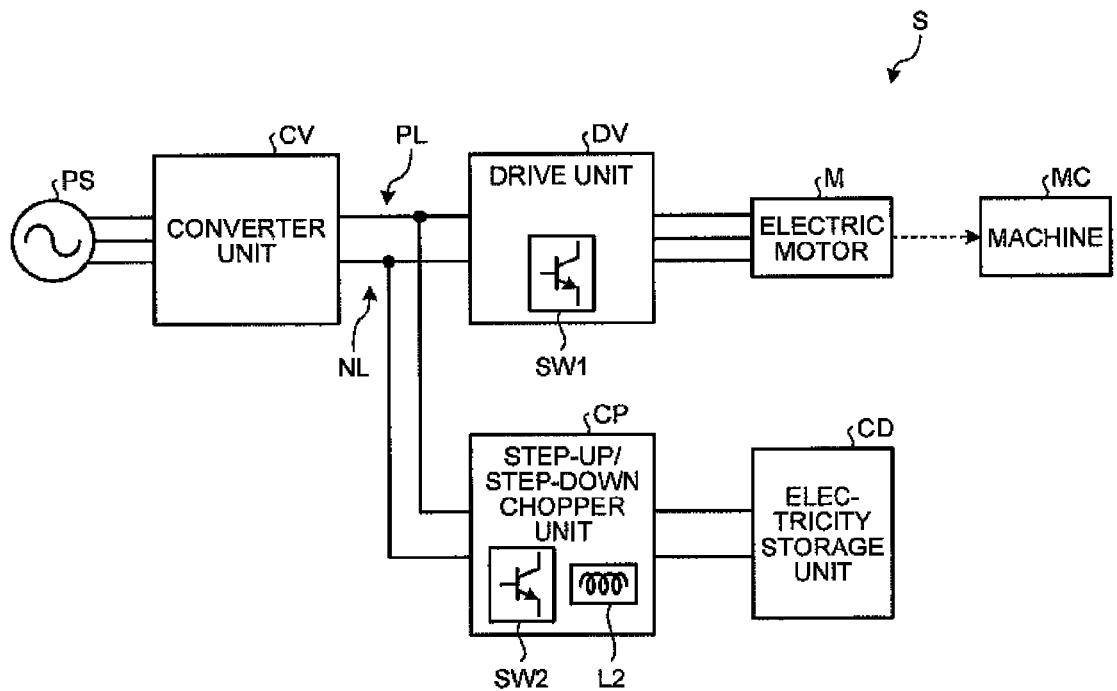
FIG. 16 is a diagram of the configuration of an energy assist system in the embodiment.

For example, as shown in FIG. 16, an energy assist system S includes a converter unit CV, a drive unit DV, a step-up/step-down chopper unit CP, an electricity storage unit CD, and an electric motor M.

The converter unit CV rectifies, with a rectifier or the like, alternating-current power (e.g., three-phase alternating-current power) supplied from a power supply PS and converts the alternating-current power into direct-current power. The converter unit CV supplies the direct-current power to the drive unit DV via direct-current buses PL and NL.

The drive unit DV receives the direct-current power from the converter unit CV. The drive unit DV converts the direct-current power into alternating-current power (e.g., three-phase alternating-current power). For example, the drive unit DV includes a plurality of switching elements SW1. The drive unit DV converts the direct-current power into alternating-current power by causing each of the switching elements SW1 to perform switching operation at predetermined respective timings. The drive unit DV drives the electric motor M by supplying the alternating-current power to the electric motor M.

The electric motor M converts the supplied alternating-current power, i.e., electric energy into mechanical energy and drives a machine MC. The electric motor M is, for example, a motor or a servo amplifier. The machine MC is, for example, a numerically controlled machine tool or a press machine.

The step-up/step-down chopper unit CP steps up or steps down a line-to-line voltage of the direct-current buses PL and NL. The step-up/step-down chopper unit CP includes, for example, a switching element SW2 and a reactor L2 and steps up or steps down the line-to-line voltage of the direct-current buses PL and NL using the switching element SW2 and the reactor L2.

For example, during regeneration (during power generation) of the electric motor M, the step-up/step-down chopper unit CP steps down the line-to-line voltage of the direct-current busses PL and NL and charges (stores) excess electric energy in the storage unit CD. That is, during the regeneration (during the power generation) of the electric motor M, the step-up/step-down chopper unit CP receives electric energy from the drive unit DV through the direct-current busses PL and NL and stores the received electric energy in the electricity storage unit CD.

For example, during power running (during energy consumption) of the electric motor M, the step-up/step-down chopper unit CP discharges the electric energy stored in the electricity storage unit CD and steps up the line-to-line voltage of the direct-current busses PL and NL. That is, during the power running (during the energy consumption) of the electric motor M, the step-up/step-down chopper unit CP extracts the electric energy from the electricity storage unit CD and supplies the electric energy to the drive unit DV through the direct-current busses PL and NL.

For example, during the regeneration (during the power generation) of the electric motor M, the electricity storage unit CD charges (stores) electric energy. For example, during the power running (during the energy consumption) of the electric motor M, the electricity storage unit CD discharges the electric energy.

In the energy assist system S, during the power running (during the energy consumption) of the electric motor M, direct-current power, i.e., electric energy that should be supplied to the drive unit DV is assisted by the electric energy charged in the electricity storage unit CD in addition to the electric energy supplied from the converter unit CV.

In FIG. 16, the converter unit CV and the drive unit DV are shown as being separated. However, the converter unit CV and the drive unit DV can be an integrated unit (an amplifier unit).

The energy assist system selection supporting apparatus 1 selects a proper combination of the units and an in-board arrangement, in which the energy assist system S is stored, based on position information (an operation pattern) of the electric motor M represented in time series generated from the configuration of the actual machine MC attached to the electric motor M and an electronic machine configuration (an electromechanical configuration) realized on the inside of the drive unit DV or on a computer.

Figure 1:
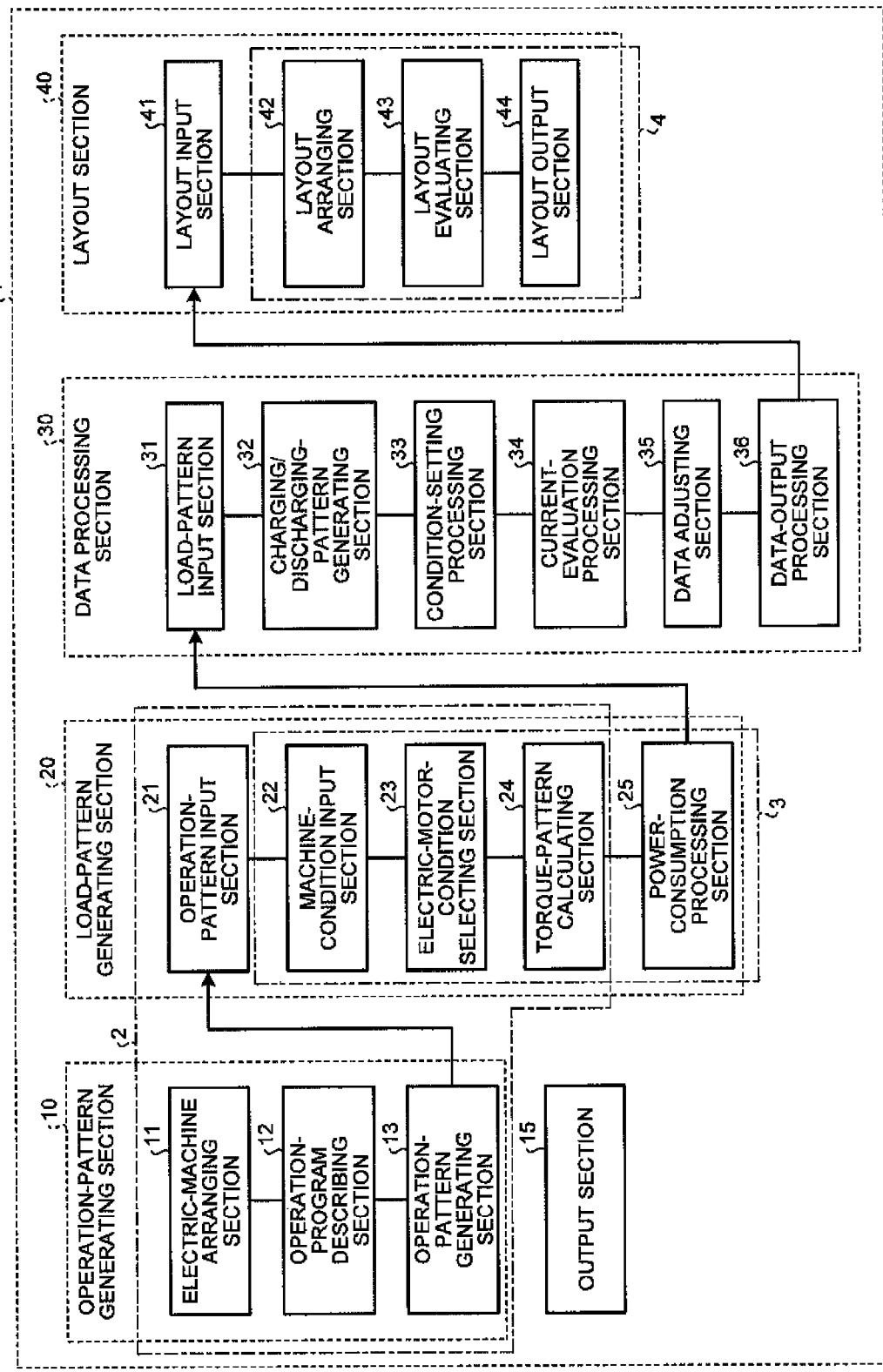
FIG. 1 is a diagram of a functional configuration of an energy assist system selection supporting apparatus according to an embodiment.

A functional configuration of the energy assist system selection supporting apparatus 1 is explained using FIG. 1. FIG. 1 is a diagram of the functional configuration of the energy assist system selection supporting apparatus 1.

The energy assist system selection supporting apparatus 1 includes an operation-pattern generating section 10, a load-pattern generating section 20, a data processing section 30, a layout section 40, and an output section 15.

The operation-pattern generating section 10 generates, according to an instruction from a user, an operation pattern taking into account an electronic machine. That is, the operation-pattern generating section 10 generates an operation pattern taking into account an electromechanical configuration and supplies the operation pattern to the load-pattern generating section 20.

Specifically, the operation-pattern generating section 10 includes an electronic-machine arranging section 11, an operation-program describing section 12, and an operation-pattern generating section 13.

The electronic-machine arranging section 11 arranges, according to an instruction from the user, a combination of electronic machines corresponding to the actual machine MC (see FIG. 16) that should be driven by the electric motor M. That is, the electronic-machine arranging section 11 selects, according to the instruction from the user, electronic machines corresponding to the machine MC, which is actually used, from a library of electronic machines, arranges the selected electronic machines on a virtual space (e.g., an electronic mechanism combination screen 61 shown in FIG. 4), and generates electronic machine conditions corresponding to the arranged electronic machines. The electronic machines include at least one of, for example, an electronic cam, an electronic gear, an electronic roller, an electronic traverse, an electronic ball screw, an electronic rotary table, an electronic virtual motor, an electronic virtual servo motor, an electronic virtual encoder, an electronic clutch, an electronic transmission, and an electronic link. The electronic machine conditions include at least one of, for example, inertial force, viscous force, spring force, gravity, friction force, and load force of a transmission system in an electronic machine. The electronic-machine arranging section 11 supplies the electronic machine conditions to the operation-pattern generating section 13 through the operation-program describing section 12 (or directly).

The operation-program describing section 12 describes an operation program according to an instruction from the user. The operation program includes, for example, an operation time and an operation start condition. For example, the operation program can be a ladder program, can be an SFC (Sequential Function Chart) program, can be a C language program, or can be an FBD (Function Block Diagram) program. The operation-program describing section 12 supplies the operation program to the operation-pattern generating section 13.

The operation-pattern generating section 13 receives the electronic machine conditions from the electronic-machine arranging section 11 and receives the operation program from the operation-program describing section 12. The operation-pattern generating section 13 generates an operation command (an operation pattern) based on the electronic machine conditions. That is, the operation-pattern generating section 13 generates an operation pattern according to the electronic machine conditions generated by the electronic-machine arranging section 11 and the operation program described by the operation-program describing section 12.

The operation-pattern generating section 13 can generate the operation pattern by importing, from simulation software, simulation data created by the user (e.g., a result obtained by simulating complicated operation patterns of a cam operation of a plurality of shafts, gears, and the like) and converting the imported simulation data into a format processable by the load-pattern generating section 20. In this case, it is possible to directly calculate energy data based on an operation pattern generated using machine mechanism simulation software created by the user taking a long time.

The operation pattern includes, for example, any one of time-series position information and speed information or both of the electric motor M and includes, for example, any one of position information and speed information or both of the electric motor M associated with time information (see FIGS. 5(a) and 5(b)). The operation pattern can further include, for example, time-series acceleration information in addition to any one of the time-series position information and speed information or both of the electric motor M. For example, the operation pattern can further include acceleration information of the electric motor M associated with time information (see FIG. 5(c)). The operation-pattern generating section 13 supplies the operation pattern to the load-pattern generating section 20.

The load-pattern generating section 20 receives the operation pattern from the operation-pattern generating section 10. The load-pattern generating section 20 calculates power consumption from the operation pattern. That is, the load-pattern generating section 20 generates a load pattern concerning the power consumption according to the operation pattern generated by the operation-pattern generating section 10 and supplies the load pattern to the data processing section 30.

Specifically, the load-pattern generating section 20 includes an operation-pattern input section 21, a machine-condition input section 22, an electric-motor-condition selecting section 23, a torque-pattern calculating section 24, and a power-consumption processing section 25.

An operation pattern is input to the operation-pattern input section 21 from the operation-pattern generating section 13. The operation-pattern input section 21 supplies the operation pattern to the electric-motor-condition selecting section 23 through the machine-condition input section 22 (or directly). The operation-pattern input section 21 supplies the operation pattern to the torque-pattern calculating section 24 through the machine-condition input section 22 and the electric-motor-condition selecting section 23 (or directly) and supplies the operation pattern to the power-consumption processing section 25 through the machine-condition input section 22, the torque-pattern calculating section 24, and the electric-motor-condition selecting section 23 (or directly).

Figures 6, 7:
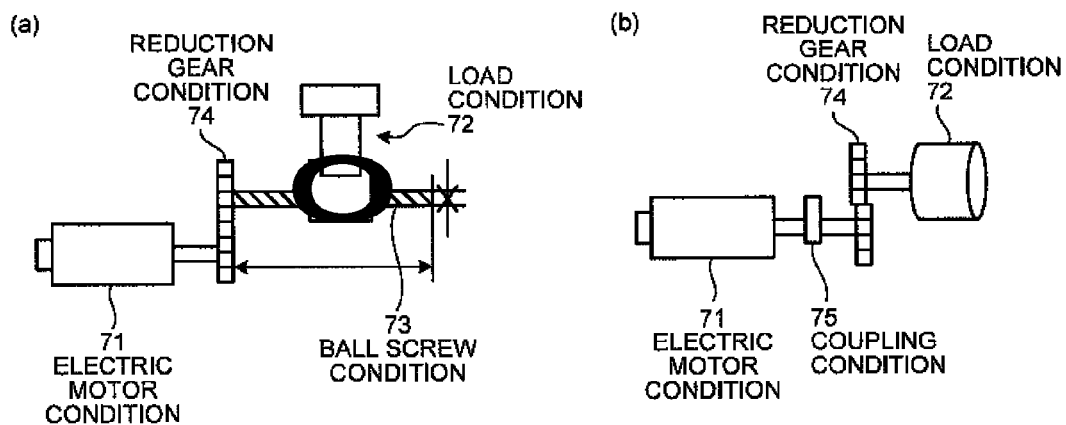
FIG. 6 is a diagram of the configuration of actual machine conditions in the embodiment.
FIG. 7 is a diagram of an input example of actual machine conditions in the embodiment.

Actual machine conditions are input to the machine-condition input section 22 from the user (see FIGS. 6(a) and 6(b) and FIG. 7). The actual machine conditions include at least one of inertial force, viscous force, spring force, gravity, friction force, and load force of a transmission system in an actual machine element. The machine-condition input section 22 supplies the actual machine conditions to the electric-motor-condition selecting section 23.

The electric-motor-condition selecting section 23 receives the operation pattern from the operation-pattern input section 21 and receives the actual machine conditions from the machine-condition input section 22. The electric-motor-condition selecting section 23 selects a proper electric motor condition according to the operation pattern and the actual machine conditions. The electric motor condition means constants indicating characteristics of an electric motor (see FIG. 8).

For example, the electric-motor-condition selecting section 23 can automatically select the electric motor condition (not via interactive processing) according to the operation pattern and the actual machine conditions. In this case, for example, the electric-motor-condition selecting section 23 can include an electric motor condition table in which each of a plurality of electric motor conditions, which are candidates of the electric motor condition, is associated with the operation pattern and the actual machine conditions. Upon receiving the operation pattern and the actual machine conditions, the electric-motor-condition selecting section 23 refers to the electric motor condition table and selects an electric motor condition matching the received operation pattern and actual machine conditions.

Alternatively, for example, the electric-motor-condition selecting section 23 can select an electric motor condition by receiving an input of an electric motor condition corresponding to the operation pattern and the actual machine conditions (via interactive processing). In this case, for example, upon receiving the operation pattern and the actual machine conditions, the electric-motor-condition selecting section 23 can display the operation pattern and the actual machine conditions on a display screen 52a (see FIG. 2) and display an input space for an electric motor condition on the display screen 52a in a form for urging an input of the electric motor condition. The electric-motor-condition selecting section 23 can select, as a proper electric motor condition, an electric motor condition input from the user. Then, the electric-motor-condition selecting section 23 can further display proper numerical value ranges as an electric motor condition. Consequently, the electric-motor-condition selecting section 23 can select, as a proper electric motor condition, an electric motor condition input from the user while urging the user to input the proper electric motor condition.

The electric-motor-condition selecting section 23 supplies the selected electric motor condition to the torque-pattern calculating section 24 and supplies the selected electric motor condition to the power-consumption processing section 25 through the torque-pattern calculating section 24 (or directly).

The torque-pattern calculating section 24 receives the operation pattern from the operation-pattern input section 21 and receives the electric motor condition from the electric-motor-condition selecting section 23. The torque-pattern calculating section 24 calculates a torque pattern according to the operation pattern and the electric motor condition. The torque-pattern calculating section 24 supplies the calculated torque pattern to the power-consumption processing section 25.

The power-consumption processing section 25 receives the operation pattern from the operation-pattern input section 21, receives the electric motor condition from the electric-motor-condition selecting section 23, and receives the torque pattern from the torque-pattern calculating section 24. The power-consumption processing section 25 calculates total power consumption of the energy assist system according to the operation pattern, the electric motor condition, and the torque pattern and calculates a load pattern concerning power consumption (see FIGS. 9(a) and 9(b)).

For example, the power-consumption processing section 25 calculates a current pattern (see FIG. 9(a)) from the torque pattern and the electric motor condition, calculates a shaft output including a copper loss, magnet torque, and reluctance torque based on the calculated current pattern (see FIG. 9(a)), and calculates total power consumption (see FIG. 9(b)) of the energy assist system from the calculated shaft output. The power-consumption processing section 25 calculates the load pattern (see FIGS. 9(a) and 9(b)) by associating the total power consumption of the energy assist system with time information.

The power-consumption processing section 25 supplies the calculated load pattern to the data processing section 30.

The data processing section 30 receives the load pattern from the load-pattern generating section 20. The data processing section 30 calculates, according to the load pattern, characteristics of the energy assist system applied with the operation pattern. The data processing section 30 evaluates the calculated characteristics of the energy assist system while comparing the characteristics with limit values and generates, according to an evaluation result, configuration information including the number of each unit of the energy assist system. The data processing section 30 displays the generated configuration information on the display screen 52a and supplies the configuration information to the layout section 40.

Specifically, the data processing section 30 includes a load-pattern input section 31, a charging/discharging-pattern generating section 32, a condition-setting processing section 33, a current-evaluation processing section 34, a data adjusting section 35, and a data-output processing section 36.

The load pattern is input to the load-pattern input section 31 from the load-pattern generating section 20. The load-pattern input section 31 supplies the load pattern to the charging/discharging-pattern generating section 32 and supplies the load pattern to the condition-setting processing section 33 through the charging/discharging-pattern generating section 32 (or directly).

The charging/discharging-pattern generating section 32 receives the load pattern from the load-pattern input section 31. The charging/discharging-pattern generating section 32 generates a charging/discharging pattern of the electricity storage unit CD (see FIG. 16) according to the load pattern (see FIGS. 9(a) and 9(b)). The charging/discharging pattern includes, for example, time-series patterns of a charging current and a discharging current (associated with time information) to and from the electricity storage unit CD by the step-up/step-down chopper unit CP. The charging/discharging-pattern generating section 32 supplies the generated charging/discharging pattern to the current-evaluation processing section 34 through the condition-setting processing section 33 (or directly).

The condition-setting processing section 33 receives the load pattern from the load-pattern input section 31. The condition-setting processing section 33 sets a number condition according to the load pattern. The number condition is a condition concerning the number of each unit of the energy assist system S and includes, for example, a condition for determining at least one of the number of step-up/step-down chopper units CP, the number of electricity storage units CD, and the number of electric motors M in the energy assist system S. The number condition can further include, for example, a condition for determining the number of converter units CV and the number of drive units DV in addition to the condition for determining the number of the step-up/step-down chopper units CP, the number of the electricity storage units CD, and the number of the electric motors M. The number condition includes, for example, the capacity and the withstand voltage of the electricity storage unit CD.

For example, the condition-setting processing section 33 can automatically set the number condition (not via interactive processing) according to the load pattern. In this case, the condition-setting processing section 33 can include a number condition table in which each of a plurality of number conditions, which are candidates of the number condition, is associated with the load pattern. Upon receiving the load pattern, the condition-setting processing section 33 refers to the number condition table and selects a number condition matching the received load pattern.

Figure 10:
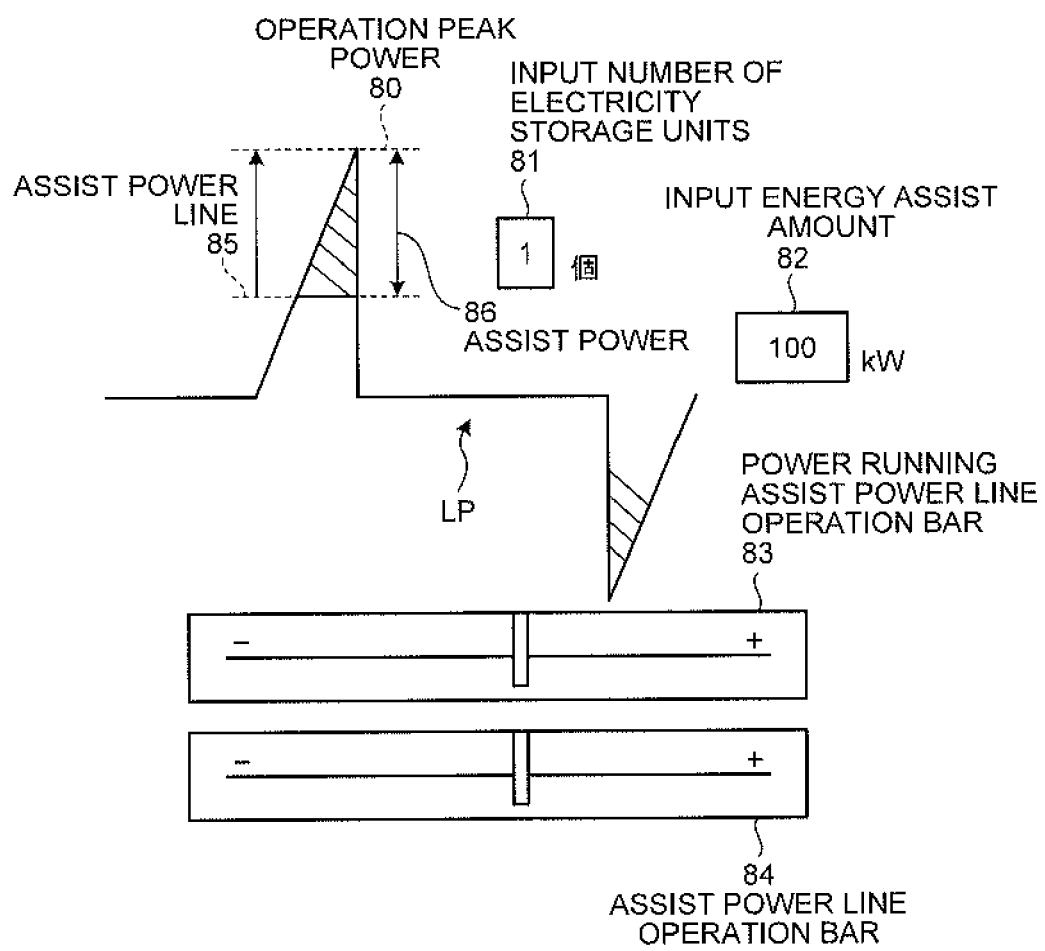
FIG. 10 is a diagram of the configuration of an operation energy adjustment screen in the embodiment.

Alternatively, for example, the condition-setting processing section 33 can set the number condition by receiving an input of a number condition corresponding to the load pattern (via interactive processing) (see FIG. 10). In this case, for example, upon receiving the load pattern, the condition-setting processing section 33 can display the load pattern on the display screen 52a (see FIG. 2) and displays an input space for a number condition on the display screen 52a in a form for urging an input of the number condition. The condition-setting processing section 33 can set, as a proper number condition, a number condition input from the user. Then, the condition-setting processing section 33 can further display a proper numerical value range as a number condition. Consequently, the condition-setting processing section 33 can set, as a proper number condition, a number condition input from the user while urging the user to input the proper number condition.

The condition-setting processing section 33 supplies the set number condition to the current-evaluation processing section 34 and supplies the set number condition to the data adjusting section 35 through the current-evaluation processing section 34 (or directly).

The current-evaluation processing section 34 receives the charging/discharging pattern from the charging/discharging-pattern generating section 32 and receives the number condition from the condition-setting processing section 33. The current-evaluation processing section 34 calculates an electric current in the energy assist system S according to the charging/discharging pattern and the number condition. The current-evaluation processing section 34 calculates, for example, a current value of a portion easily affected by the electric current and deteriorated in the energy assist system S. For example, the current-evaluation processing section 34 can calculate an electric current flowing through the switching element SW1 in the energy assist system S, can calculate an electric current flowing through the switching element SW2, or can calculate an electric current flowing through the reactor L2 (see FIG. 16).

The current-evaluation processing section 34 compares the calculated electric current of the energy assist system with a current limit value. For example, the current-evaluation processing section 34 can compare the electric current flowing through the switching element SW1 in the energy assist system S with a current limit value THSW1 for the switching element SW1, can compare the electric current flowing through the switching element SW2 with a current limit value THSW2 for the switching element SW2, or can compare the electric current flowing through the reactor L2 with a current limit value THL2 for the reactor L2. The current-evaluation processing section 34 evaluates characteristics of the energy assist system according to a comparison result. The evaluation result can include, for example, information concerning energy in the energy assist system and can include, for example, information concerning assist power and peak power. The current-evaluation processing section 34 supplies an evaluation result to the data adjusting section 35 and supplies the evaluation result to the data-output processing section 36 through the data adjusting section 35 (or directly).

The data adjusting section 35 receives the evaluation result from the current-evaluation processing section 34 and receives the number condition from the condition-setting processing section 33. The data adjusting section 35 adjusts the number condition set by the condition-setting processing section 33 and generates configuration information. For example, the data adjusting section 35 calculates, according to the evaluation result, for example, the number of each unit necessary in the energy assist system S. The configuration information is information concerning the configuration of the energy assist system and includes, for example, the number of each unit in the energy assist system. The configuration information includes, for example, a necessary number of the electricity storage units CD, a necessary number of the step-up/step-down chopper units CP, and a necessary number of the electric motors M (see FIG. 16). The data adjusting section 35 supplies the generated configuration information to the data-output processing section 36.

The data-output processing section 36 receives the configuration information from the data adjusting section 35 and receives the evaluation result from the current-evaluation processing section 34. The data-output processing section 36 displays the configuration information and the evaluation result on the display screen 52a. For example, the data-output processing section 36 displays, according to the configuration information and the evaluation result, the configuration information and energy of the energy assist system applied with the configuration information on the display screen 52a. For example, the data-output processing section 36 displays information concerning the number of the electricity storage units CD, assist power, peak power, and the like on the display screen 52a (see FIG. 10).

The data-output processing section 36 supplies the configuration information and the evaluation result to the layout section 40.

The layout section 40 receives the configuration information and the evaluation result from the data processing section 30. The layout section 40 lays out and arranges the units of the energy assist system on a virtual space and displays the units on the display screen 52*a* according to the configuration information. The layout section 40 supplies a layout result to the output section 15.

Specifically, the layout section 40 includes a layout input section 41, a layout arranging section 42, a layout evaluating section 43, and a layout output section 44.

The configuration information and the evaluation result are input to the layout input section 41 from the data-output processing section 36. The layout input section 41 supplies the configuration information and the evaluation result to the layout arranging section 42. When requested from the layout output section 44, the layout input section 41 supplies the configuration information to the layout output section 44 through the layout arranging section 42 and the layout evaluating section 43 (or directly).

The layout arranging section 42 receives the configuration information and the evaluation result from the layout input section 41. The layout arranging section 42 displays, according to the evaluation result, information concerning energy of the energy assist system applied with the configuration information (e.g., data of an electric current and electric power) on the display screen 52*a*. At the same time, the layout arranging section 42 lays out and arranges, according to the configuration information and an instruction from the user, display objects indicating the units of the energy assist system on the display screen 52*a*.

For example, the layout arranging section 42 can lay out and arrange, according to the configuration information, the display objects indicating the units of the energy assist system in a default position (e.g., a unit area 101 shown in FIG. 13) on the display screen 52*a*. The layout arranging section 42 changes the positions of the display objects on the display screen 52*a* according to an instruction from the user. For example, the layout arranging section 42 can receive drag-and-drop operation from the user via an input interface such as a mouse pointer or a touch panel and change the positions of the display objects on the display screen 52*a* according to the drag-and-drop operation. That is, the layout arranging section 42 can change the positions of the display objects on the display screen 52*a* to desired positions in a virtual space (e.g., an arrangement area 102 shown in FIG. 13) corresponding to a space in an actual control board. Consequently, the user can examine the arrangement concerning the units in the energy assist system using the layout arranging section 42.

After performing the layout arrangement, the layout arranging section 42 supplies layout information to the layout evaluating section 43. The layout information is information concerning the position of the display objects indicating the laid-out and arranged units on the display screen 52*a* and is, for example, information in which an identifier of a unit, an identifier of a display object, and an arranged position (a coordinate) of arrangement on the display screen 52*a* are associated with one another concerning a plurality of units. For example, every time the layout arrangement is changed, the layout arranging section 42 updates the layout information and supplies the updated layout information to the layout evaluating section 43.

When requested from the layout output section 44, the layout arranging section 42 supplies the layout information to the layout output section 44 through the layout evaluating section 43 (or directly).

The layout evaluating section 43 receives the layout information from the layout arranging section 42. The layout evaluating section 43 evaluates the layout information while comparing the layout information with a layout limit value. For example, the layout limit value can include a limit value concerning electrical possibility of a layout arrangement or can include a limit value concerning physical possibility of, for example, dimensions of the units.

For example, the layout evaluating section 43 compares the number of parallel connections of arrangeable electricity storage units determined from a charging and discharging time constant due to impedance and a charging/discharging pattern and the number of parallel connections of electricity storage units arranged by the user to thereby determine whether the number of parallel connections of the electricity storage units arranged by the user is within an allowable range. The layout evaluating section 43 can set a result of the determination as an evaluation result for the layout information.

The layout evaluating section 43 supplies the evaluation result to the layout output section 44.

The layout output section 44 receives the evaluation result from the layout evaluating section 43. The layout output section 44 outputs a warning according to the evaluation result. Alternatively, the layout output section 44 outputs the layout information to the output section 15.

For example, when the layout information deviates from an allowable range corresponding to a layout limit value, the layout output section 44 outputs a warning. For example, when the number of parallel connections of the electricity storage units arranged by the user is outside an allowable range, the layout output section 44 outputs a warning. As a method of outputting a warning, a visual method for, for example, displaying a warning message on the display screen 52*a* or flashing an alarm lamp can be used or an auditory method for, for example, outputting a warning message by sound from a sound output section 49 or outputting an alarm buzzer from the sound output section 49 can be used. Consequently, it is possible to urge the user to reexamine the arrangement concerning the units using the layout arranging section 42.

Alternatively, for example, when the layout information fits within the allowable range corresponding to the layout limit value, the layout output section 44 requests the layout arranging section 42 to receive the layout information from the layout arranging section 42. The layout output section 44 supplies the layout information to the output section 15 as a layout result and generates, according to the layout information, for example, a list of the number of each unit and supplies the list to the output section 15. In the list of the number of each unit, for example, an identifier of a unit and the number of units are associated with each other concerning each of a plurality of units.

For example, according to a request of an external controller (not shown in the figure), the output section 15 outputs the layout information and the list of the number of each unit to an external apparatus (e.g., a printer) or transmits the layout information and the list of the number of each unit to the external controller through a communication line.

In this way, it is possible to evaluate the number of parallel connections and layout of the electricity storage units and the step-up/step-down chopper units matching a condition of use.

The electric motor condition selected by the electric-motor-condition selecting section 23 includes, for example, a characteristic of an electric motor necessary for calculating the capacity of the electric motor (e.g., the number of revolutions and rated torque shown in FIG. 8). For example, as shown in FIG. 1, a configuration including the electronic-machine arranging section 11, the operation-program describing section 12, the operation-pattern generating section 13, the operation-pattern input section 21, the machine-condition input section 22, the torque-pattern calculating section 24, and the electric-motor-condition selecting section 23 can also be grasped as a capacity selecting apparatus 2 that performs capacity selection for the motor. The capacity of the electric motor selected by the capacity selecting apparatus 2 supports in selecting the energy assist system such that a characteristic of the energy assist system fits within an allowable range corresponding to a limit value as explained above.

Alternatively, an apparatus can be configured focusing on the power consumption calculated by the power-consumption processing section 25. For example, as shown in FIG. 1, a configuration including the machine-condition input section 22, the electric-motor-condition selecting section 23, the torque-pattern calculating section 24, and the power-consumption processing section 25 can also be grasped as a power-consumption calculating apparatus 3 that calculates total power consumption of the energy assist system. The total power consumption of the energy assist system calculated by the power-consumption calculating apparatus 3 supports in selecting the energy assist system such that a characteristic of the energy assist system fits within an allowable range corresponding to a limit value as explained above.

Alternatively, an apparatus can be configured focusing on the layout information output by the layout output section 44. For example, as shown in FIG. 1, a configuration including the layout arranging section 42, the layout evaluating section 43, and the layout output section 44 can also be grasped as a layout generating apparatus 4 that generates layout information of the units of the energy assist system. The layout information generated by the layout generating apparatus 4 supports in selecting a layout of the energy assist system such that a layout of the units of the energy assist system fits within an allowable range corresponding to a layout limit value.

Figure 2:
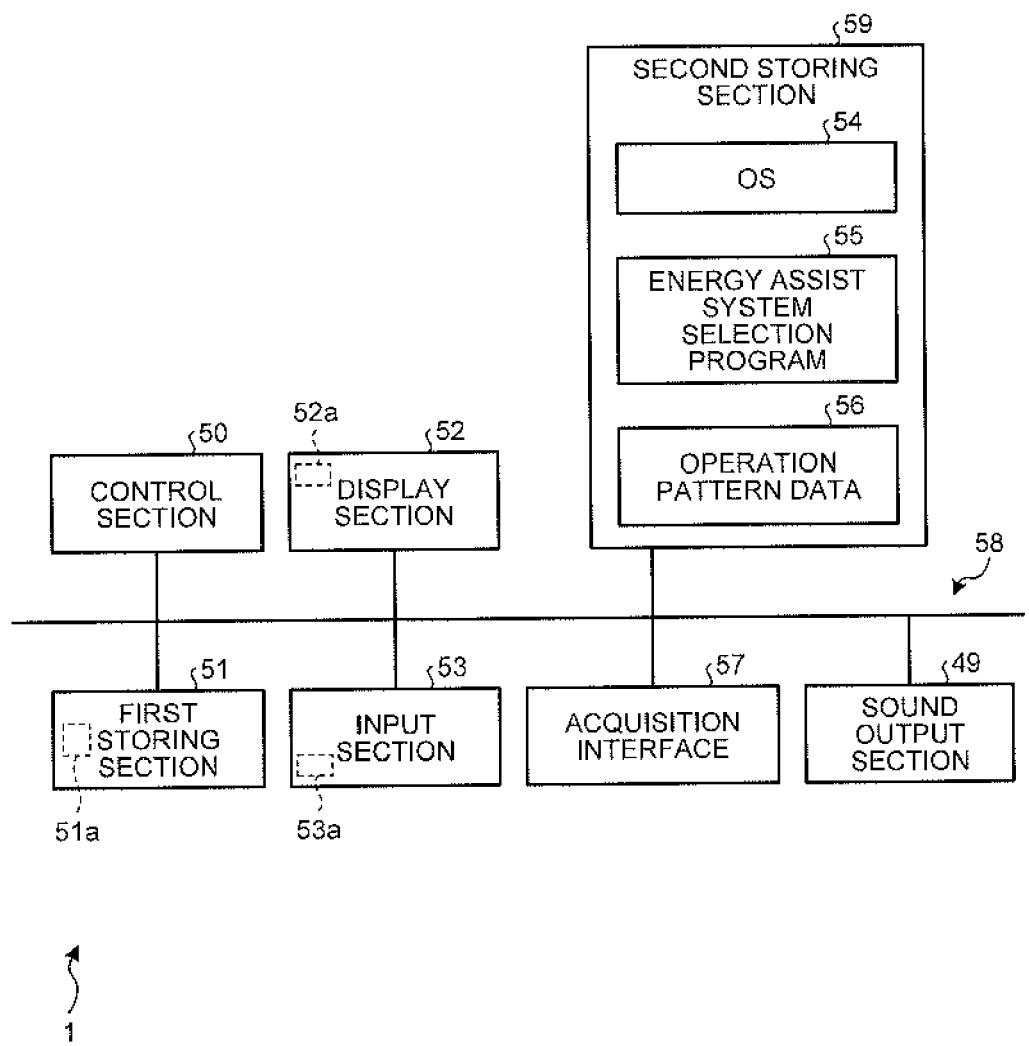
FIG. 2 is a diagram of a hardware configuration of the energy assist system selection supporting apparatus according to the embodiment.

A hardware configuration of the energy assist system selection supporting apparatus 1 is explained with reference to FIG. 2. FIG. 2 is a diagram of the hardware configuration of the energy assist system selection supporting apparatus 1.

The energy assist system selection supporting apparatus 1 includes a first storing section 51, a display section 52, an input section 53, a second storing section 59, an acquisition interface 57, and a control section 50. The first storing section 51, the display section 52, the input section 53, the acquisition interface 57, the second storing section 59, and the control section 50 are connected to one another via a bus 58.

The first storing section 51 temporarily stores information under the control by the control section 50. The first storing section 51 includes, for example, a work area 51a functioning as a working area for the control section 50. The first storing section 51 includes a volatile storage medium and is configured by, for example, a DRAM (Dynamic Random Access Memory).

The display section 52 displays predetermined information on the display screen 52a under the control by the control section 50. The display section 52 is, for example, a display device and includes, for example, a liquid crystal display.

The input section 53 includes an input interface 53a and receives a predetermined instruction from the user via the input interface 53a. The input interface 53a is, for example, a keyboard, a mouse, or a touch panel.

The second storing section 59 stores information in a nonvolatile manner under the control by the control section 50. The second storing section 59 includes a nonvolatile storage medium and includes, for example, a hard disk.

The second storing section 59 stores, for example, an OS (Operating System) 54, an energy assist system selection program 55, and operation pattern data 56. The OS 54 is a system functioning as a platform when the control section 50 executes the energy assist system selection program 55. The energy assist system selection program 55 is a program for realizing the functional configuration in the energy assist system selection supporting apparatus 1. The operation pattern data 56 is data of an operation pattern generated by the operation-pattern generating section 13.

In FIG. 2, the operation pattern data 56 is shown as intermediate data stored in the second storing section 59 due to the execution of the energy assist system selection program 55. However, other intermediate data (e.g., data of a torque pattern, data of a charging/discharging pattern, and layout information) and various setting data (e.g., library data of an electronic machine and an electric motor condition table) can be stored in the second storing section 59.

The acquisition interface 57 is an interface for acquiring the energy assist system selection program 55 and installing the energy assist system selection program 55 in the second storing section 59. For example, the acquisition interface 57 is a storage medium interface for reading information written in a storage medium (e.g., a CD-ROM) when the energy assist system selection program 55 is acquired from the storage medium. Alternatively, for example, the acquisition interface 57 is a communication interface for receiving downloaded data when the energy assist system selection program 55 is downloaded and acquired through a communication line (e.g., the Internet).

The control section 50 comprehensively controls the sections in the energy assist system selection supporting apparatus 1. The control section 50 is, for example, a CPU (Central Processing Unit).

For example, the energy assist system selection program 55 is executed by the control section 50, whereby the functional configuration shown in FIG. 1 is formed in the energy assist system selection supporting apparatus 1 (e.g., in the work area 51a in the first storing section 51). The functional sections of the energy assist system selection supporting apparatus 1 can be collectively formed according to the start of the execution of the energy assist system selection program 55 or can be sequentially formed according to an execution state of the energy assist system selection program 55.

As shown in FIG. 2, the energy assist system selection supporting apparatus 1 can further include the sound output section 49. The sound output section 49 outputs sound information under the control of the control section 50. The sound output section 49 is, for example, a speaker.

Figure 3:
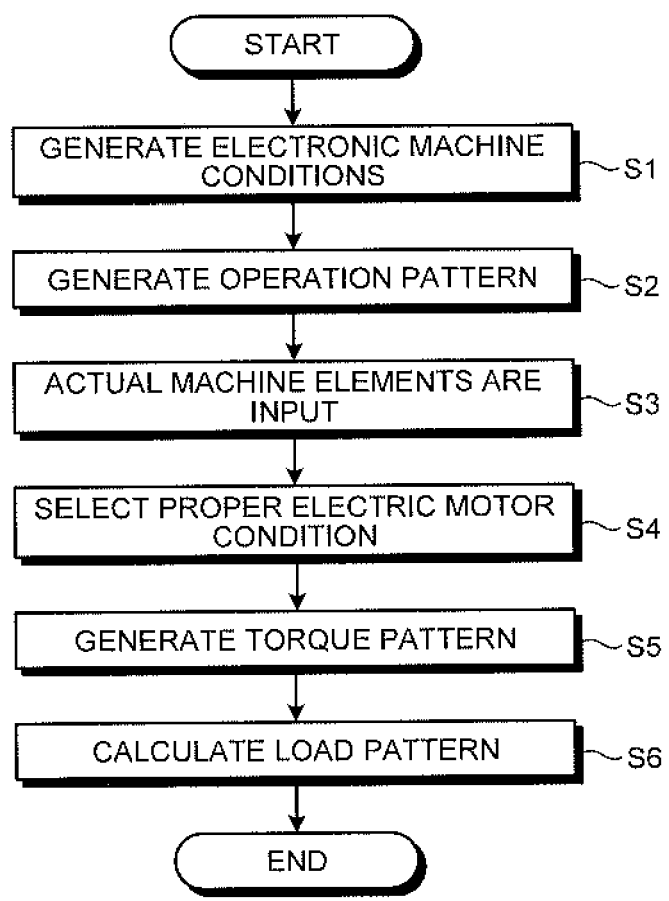
FIG. 3 is a flowchart for explaining the operations of an operation-pattern generating section and a load-pattern generating section in the embodiment.

The operation of the operation-pattern generating section 10 (an operation pattern creating function) and the operation of the load-pattern generating section 20 (a load pattern creating function) are explained with reference to FIG. 3. FIG. 3 is a flowchart for explaining the operations of the operation-pattern generating section 10 and the load-pattern generating section 20.

At step S1, the control section 50 starts the energy assist system selection program 55 and starts execution of the energy assist system selection program 55 according to a start instruction from the user. The control section 50 can start an external program having an equivalent function instead of the energy assist system selection program 55 and start execution of the program.

The electronic-machine arranging section 11 arranges, according to an instruction from the user, a combination of electronic machines corresponding to the actual machine MC (see FIG. 16) that should be driven by the electric motor M. That is, the electronic-machine arranging section 11 selects, according to the instruction from the user, electronic machines corresponding to the machine MC to be actually used out of a library of electronic machines, arranges the selected electronic machines on a virtual space (e.g., the electronic mechanism combination screen 61 shown in FIG. 4), and generates electronic machine conditions corresponding to the arranged electronic machines. The electronic machines include at least one of, for example, an electronic cam, an electronic gear, an electronic roller, an electronic traverse, an electronic ball screw, an electronic rotary table, an electronic virtual motor, an electronic virtual servo motor, an electronic virtual encoder, an electronic clutch, an electronic transmission, and an electronic link. The electronic machine conditions include at least one of, for example, inertial force, viscous force, spring force, gravity, friction force, and load force in an electronic machine. The electronic-machine arranging section 11 supplies the electronic machine conditions to the operation-pattern generating section 13 via the operation-program describing section 12 (or directly).

At step S2, the operation-program describing section 12 describes an operation program according to an instruction from the user. The operation program includes, for example, an operation time and an operation start condition. For example, the operation program can be a ladder program, can be an SFC (Sequential Function Chart) program, can be a C language program, or can be an FBD (Function Block Diagram) program. The operation-program describing section 12 supplies the operation program to the operation-pattern generating section 13.

The operation-pattern generating section 13 receives the electronic machine conditions from the electronic-machine arranging section 11 and receives the operation program from the operation-program describing section 12. The operation-pattern generating section 13 generates an operation command, i.e., an operation pattern based on the electronic machine conditions. That is, the operation-pattern generating section 13 generates an operation pattern according to the electronic machine conditions generated by the electronic-machine arranging section 11 and the operation program described by the operation-program describing section 12.

For example, the operation-pattern generating section 13 applies interpolation processing such as linear interpolation, circular interpolation, PTP (Point To Point) interpolation, or three-dimensional linear circular interpolation to the electronic machine configuration included in the electronic machine conditions and generates an operation pattern according to a result of the interpolation.

Figure 5:
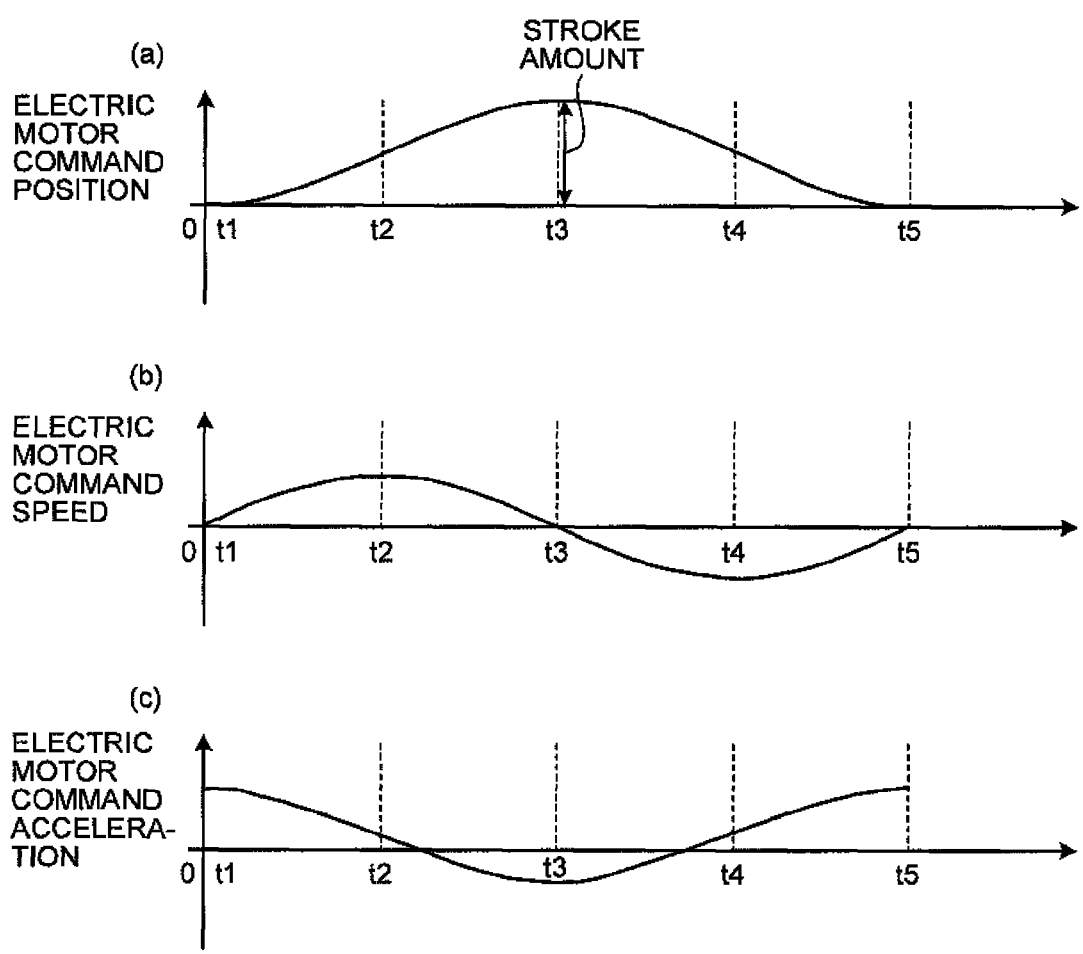
FIG. 5 is a diagram of an operation pattern in the embodiment.

The operation pattern includes, for example, any one of time-series position information and speed information or both of the electric motor M and includes, for example, any one of position information and speed information or both of the electric motor M associated with time information (see FIGS. 5(*a*) and 5(*b*)). For example, in addition to any one of the time-series position information and the speed information or both of the electronic motor M, the operation pattern can further include time-series acceleration information and can include, for example, acceleration information of the electric motor M associated with time information (see FIG. 5(*c*)). The operation-pattern generating section 13 supplies the operation pattern to the load-pattern generating section 20.

At step S3, actual machine conditions are input to the machine-condition input section 22 from the user (see FIGS. 6(*a*) and 6(*b*) and FIG. 7). The actual machine conditions include at least one of inertial force, viscous force, spring force, gravity, friction force, and load force of a transmission system in an actual machine element.

For example, the user inputs machine information such as the width, the length, and the mass of a hand truck to the machine-condition input section 22 with respect to machine models such as inertia, friction, a horizontal ball screw, a vertical ball screw, a lack & pinion, a roll feed, a rotary table, a hand truck, an elevator, a conveyor, and a linear servo. Specific conditions can be input to the machine-condition input section 22 or inertial forces of a transmission system such as viscosity, a spring, gravity, friction, and load can be directly combined and input to the machine-condition input section 22.

The machine-condition input section 22 supplies the actual machine conditions to the torque-pattern calculating section 24. Then, the operation pattern can be separately stored in the second storing section 59 as the operation pattern data 56.

The torque-pattern calculating section 24 receives the actual machine conditions from the machine-condition input section 22. The torque-pattern calculating section 24 calculates a torque pattern taking into account the actual machine conditions. The torque-pattern calculating section 24 supplies the torque pattern to the electric-motor-condition selecting section 23 and supplies the torque pattern to the power-consumption processing section 25 through the electric-motor-condition selecting section 23 (or directly).

At step S4, the electric-motor-condition selecting section 23 receives the operation pattern from the operation-pattern input section 21 and receives the actual machine conditions from the machine-condition input section 22. The electric-motor-condition selecting section 23 selects a proper electric motor condition according to the operation pattern and the actual machine conditions. The electric motor condition means, for example, constants indicating characteristics of an electric motor (see FIG. 8).

For example, the electric-motor-condition selecting section 23 can automatically select an electric motor condition (not via interactive processing) according to the operation pattern and the actual machine conditions. In this case, for example, the electric-motor-condition selecting section 23 can include an electric motor condition table in which each of a plurality of electric motor conditions, which are candidates of the electric motor condition, is associated with the operation pattern and the actual machine conditions. Upon receiving the operation pattern and the actual machine conditions, the electric-motor-condition selecting section 23 refers to the electric motor condition table and selects an electric motor condition matching the received operation pattern and actual machine conditions. The electric motor condition table can be included in the energy assist system selection program 55 and dynamically generated according to the execution of the energy assist system selection program 55 or can be stored in the second storing section 59 in advance.

Alternatively, for example, the electric-motor-condition selecting section 23 can select an electric motor condition by receiving an input of an electric motor condition (via interactive processing) corresponding to the operation pattern and the actual machine conditions. In this case, for example, upon receiving the operation pattern and the actual machine conditions, the electric-motor-condition selecting section 23 can display the operation pattern and the actual machine conditions on the display screen 52*a* (see FIG. 2) and display an input space for an electric motor condition on the display screen 52*a* in a form for urging an input of the electric motor condition. The electric-motor-condition selecting section 23 can select, as a proper electric motor condition, an electric motor condition input from the user. Then, the electric-motor-condition selecting section 23 can further display proper numerical value ranges as the electric motor condition. Consequently, the electric-motor-condition selecting section 23 can select, as a proper electric motor condition, an electric motor condition input from the user while urging the user to input the proper electric motor condition.

The electric-motor-condition selecting section 23 supplies the selected electric motor condition to the torque-pattern calculating section 24 and supplies the selected electric motor condition to the power-consumption processing section 25 through the torque-pattern calculating section 24 (or directly).

At step S5, the torque-pattern calculating section 24 receives the electric motor condition from the electric-motor-condition selecting section 23. The torque-pattern calculating section 24 calculates a torque pattern according to the electric motor condition. The torque-pattern calculating section 24 supplies the calculated torque pattern to the power-consumption processing section [25].

The torque-pattern calculating section 24 reads out a torque constant from the electric motor condition and calculates a torque pattern using the torque constant.

For example, in the case of an electric motor in which a torque constant and a Q-axis current value are proportional, the torque-pattern calculating section 24 calculates torque data (a torque pattern) in each time series using the torque constant and graphs of speed, position, and acceleration (e.g., operation patterns shown in FIGS. 5(*a*) to 5(*c*)). For example, the torque-pattern calculating section 24 calculates load torque T applied to the electric motor from the graph of acceleration (see FIG. 5(*c*)) and calculates a torque constant Kt [Nm] by dividing rated torque included in the electric motor condition by a current rated value. As indicated by the following Formula 1, the torque-pattern calculating section 24 calculates a Q-axis current value IQ [A] by dividing the load torque T applied to the electric motor by the torque constant Kt [Nm]. For example, the torque-pattern calculating section 24 calculates a first torque pattern by associating the Q-axis current value IQ with time information.

$$IQ = T/Kt \quad (1)$$

Alternatively, for example, in the case of an electric motor (e.g., an IPM motor) in which a torque constant and a Q-axis current value are not proportional, for example, the torque-pattern calculating section 24 calculates the load torque T applied to the electric motor from the graph of acceleration (see FIG. 5(*c*)) and calculates the Q-axis current value IQ from the load torque T based on relation information between torque and an electric current calculated in advance. For example, the torque-pattern calculating section 24 calculates a first torque pattern by associating the Q-axis current value IQ with time information.

The torque-pattern calculating section 24 calculates a D-axis current value ID as well by performing a conversion calculation of a current phase angle, which has been input in advance, based on current phase information indicating a correlation among torque, a Q-axis current value, and a D-axis current value or simply from the Q-axis current value. The torque-pattern calculating section 24 calculates a second torque pattern by associating the D-axis current value ID with time information.

At the same time, the torque-pattern calculating section 24 calculates a phase current I for each unit time as well by subjecting the Q-axis current value IQ and the D-axis current value ID to vector conversion according to the following Formula 2. The torque-pattern calculating section 24 calculates a third torque pattern by associating the phase current I with time information.

$$I = \sqrt{IQ^2 + ID^2} \quad (2)$$

The torque-pattern calculating section 24 supplies the calculated first torque pattern, second torque pattern, and third torque pattern to the power-consumption processing section 25.

At step S6, the power-consumption processing section 25 receives the operation pattern from the operation-pattern input section 21, receives the electric motor condition from the electric-motor-condition selecting section 23, and receives the torque pattern from the torque-pattern calculating section 24. The power-consumption processing section 25 calculates total power consumption of the energy assist system according to the operation pattern, the electric motor condition, and the torque pattern and calculates a load pattern concerning power consumption (see FIGS. 9(*a*) and 9(*b*)).

For example, the power-consumption processing section 25 reads fixed parameters of an inducted voltage constant Ke [v/rad/s], a resistance value R [Ω], a reluctance Ldq [H], and of the number of pole pairs Pm from the electric motor condition (see FIG. 8) and specifies rotating speed ω [rad/s] from the operation pattern. The power-consumption processing section 25 calculates a copper loss and reluctance torque in addition to magnet torque according to the read fixed parameters, the specified rotating speed ω, the first torque pattern (the Q-axis current value IQ), the second torque pattern (the D-axis current value ID), and the third torque pattern (the phase current I) and calculates electric power P [W] according to the following Formula 3.

$$P = \{Ke \times \omega \times IQ\} + \{\omega \times P_m \times L_{dq} \times IQ \times IQ\} + \{R \times (ID^2 + IQ^2)\} \quad (3)$$

In Formula (3), the first term of the left side represents the magnet torque, the second term of the left side represents the reluctance torque, and the third term of the left side represents the copper loss. By using the Formula (3), even in an electric motor (e.g., an IPM Motor) in which power consumption of reluctance torque is large, it is possible to accurately calculate power consumption.

When electric power is calculated based on a power calculation method, electric power can be calculated according to the following Formula 4 for multiplying together the torque [Nm] and the rotating speed ω [rad/s] or means for setting, as power consumption, a model of a total value of an electric motor output, an iron loss, and a copper loss used in the past can be used.

$$P = T^* \omega \quad (4)$$

Figure 4:
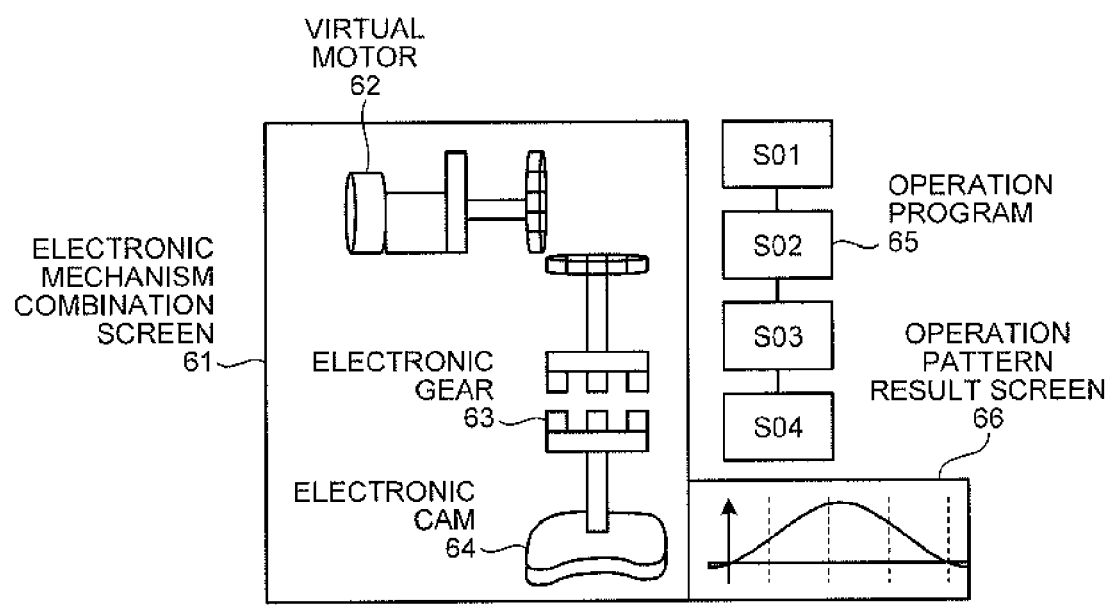
FIG. 4 is a diagram of the operation of an operation pattern generation tool in the embodiment.

The operation of an operation pattern generation tool corresponding to the operation-pattern generating section 10 is explained with reference to FIG. 4. FIG. 4 is a diagram of the operation of the operation pattern generation tool.

The processing at step S1 and step S2 explained above is performed by, for example, the operation pattern generation tool shown in FIG. 4. For example, at step S1, the electronic mechanism combination screen 61 shown in FIG. 4, which is displayed on the display screen 52*a* by the operation pattern generation tool, is used. On the electronic mechanism combination screen 61, for example, a predetermined button object (not shown in the figure) is clicked, whereby names, icons, or the like of a plurality of electronic machines registered in a library of electronic machines are displayed in, for example, a drop-down format. The user arranges electronic machines such as an electronic virtual motor 62, an electronic gear 63, and an electronic cam 64 on the electronic mechanism combination screen 61. For example, on the electronic mechanism combination screen 61, electronic machines selected by click or the like from the names, the icons, or the like of the electronic machines displayed in the drop-down format are arranged in position selected by click or the like on the electronic mechanism combination screen 61. The electronic-machine arranging section 11 generates electronic machine conditions by receiving an input concerning conditions of electronic machines from the user or according to the positions where the electronic machines are arranged (e.g., by taking into account a positional relation with other electronic machines, a relation of operations, and the like). Then, virtual motors can be arranged on a plurality of shafts or a plurality of actual shafts to be output can be arranged to cause the electronic-machine arranging section 11 to perform a calculation.

In conjunction with the arrangement of the electronic machines (step S1), for example, at step S2, the operation-program describing section 12 generates an operation program 65 such as a combination of an operation time condition and an operation condition of an electronic mechanism configuration. The operation-pattern generating section 13 generates an operation command pattern (see FIGS. 5(*a*) to 5(*c*)) to be output to an actual motor from the electronic mechanism combination screen 61 and the conditions of the operation program 65 and displays the operation command pattern on an operation pattern result screen 66. By combining operation actions of the electronic machine conditions shown in FIG. 4, for example, it is possible to perform an operation power consumption calculation, capacity selection, and selection of an energy assist system of a machine tool and equipment that perform an operation pattern action of a specific electronic cam on a ball screw.

The operation pattern obtained at step S2 is explained with reference to FIG. 5. FIGS. 5(*a*) to 5(*c*) illustratively show, as an operation pattern, an operation pattern of the electric motor M corresponding to an action of an electronic cam.

For example, FIG. 5(*a*) shows a command position of the electric motor M corresponding to the action of the electronic cam. For example, the command position shown in FIG. 5(*a*) is calculated from a stroke amount of the cam, a period per one rotation of the electronic cam, an operation pattern, information concerning time, and the like set by the user. For an input of electronic cam conditions, means for rendering an operation cycle or means for arranging time-series positions can also be used.

For example, FIG. 5(*b*) shows command speed of the electric motor M corresponding to the action of the electronic cam. For example, the command speed shown in FIG. 5(*b*) is calculated by calculating a change ratio (integration) in a unit time with respect to the command position shown in FIG. 5(*a*).

For example, FIG. 5(*c*) shows command acceleration of the electric motor M corresponding to the action of the electronic cam. For example, the command acceleration shown in FIG. 5(*c*) is calculated by calculating a change ratio (integration) in a unit time with respect to the command speed shown in FIG. 5(*b*). Consequently, for example, an operation pattern including, a position, speed, and acceleration is created.

The actual machine conditions input at step S3 are explained with reference to FIGS. 6 and 7. FIGS. 6(*a*) and 6(*b*) are diagrams of the configuration of the actual machine conditions. FIG. 7 is a diagram of an input example of the actual machine conditions.

For example, in FIG. 6(*a*), a ball screw, a load, and a reduction gear are designated as actual machine elements and a ball screw condition 73, a load condition 72, and a reduction gear condition 74 respectively corresponding thereto are input to the machine-condition input section 22. For example, the machine-condition input section 22 generates display objects of the ball screw, the load, and the reduction gear according to the configuration of a plurality of electronic machines arranged in the electronic-machine arranging section 11 (electronic machine conditions) and displays the display objects on the display screen 52*a*. For example, the user clicks the display objects of the ball screw, the load, and the reduction gear to realize a state in which actual machine conditions can be input and inputs the ball screw condition 73, the load condition 72, and the reduction gear condition 74. Accordingly, at step S4, an electric motor condition 71 is selected.

For example, as shown in FIG. 7, as the ball screw condition 73, a ball screw lead, a ball screw diameter, a ball screw length, driving section efficiency, and a coefficient of friction are input. As the load condition 72, table mass, load mass, load resistance force, and fastening force of a table guide surface are input. As the reduction gear condition 74, a reduction ratio and reduction gear inertia are input.

For example, in FIG. 6(*b*), as the actual machine elements, a load, a reduction gear, and a coupling are designated and the load condition 72, the reduction gear condition 74, and a coupling condition 75 respectively corresponding thereto are input to the machine-condition input section 22. For example, the machine-condition input section 22 generates display objects of the load, the reduction gear, and the coupling according to the configuration of a plurality of electronic machines arranged in the electronic-machine arranging section 11 (electronic machine conditions) and displays the display objects on the display screen 52*a*. For example, the user clicks the display objects of the load, the reduction gear, and the coupling to realize a state in which actual machine conditions can be input and inputs the load condition 72, the reduction gear condition 74, and the coupling condition 75. Accordingly, at step S4, the electric motor condition 71 is selected.

For example, as shown in FIG. 7, as the load condition 72, table mass, load mass, load resistance force, and fastening force of a table guide surface are input. As the reduction gear condition 74, a reduction ratio and reduction gear inertia are input. As the coupling condition 75, coupling inertia and other output shaft converted inertia are input.

The electric motor condition selected at step S4 is explained with reference to FIG. 8. FIG. 8 is a diagram of a selection example of an electric motor condition.

For example, in FIG. 8, various constants indicating characteristics of an electric motor are selected as the electric motor condition 71 (see FIGS. 6(*a*) and 6(*b*)). According to the operation pattern and the actual machine conditions, for example, in FIG. 8, as the electric motor condition 71, an induced voltage constant, resistance, the number of pole pairs, the number of revolutions, a q-axis current, a d-axis current, a difference between a d-axis inductance Ld and a q-axis inductance Lq, a current rated value, and rated torque are selected.

Figure 11:
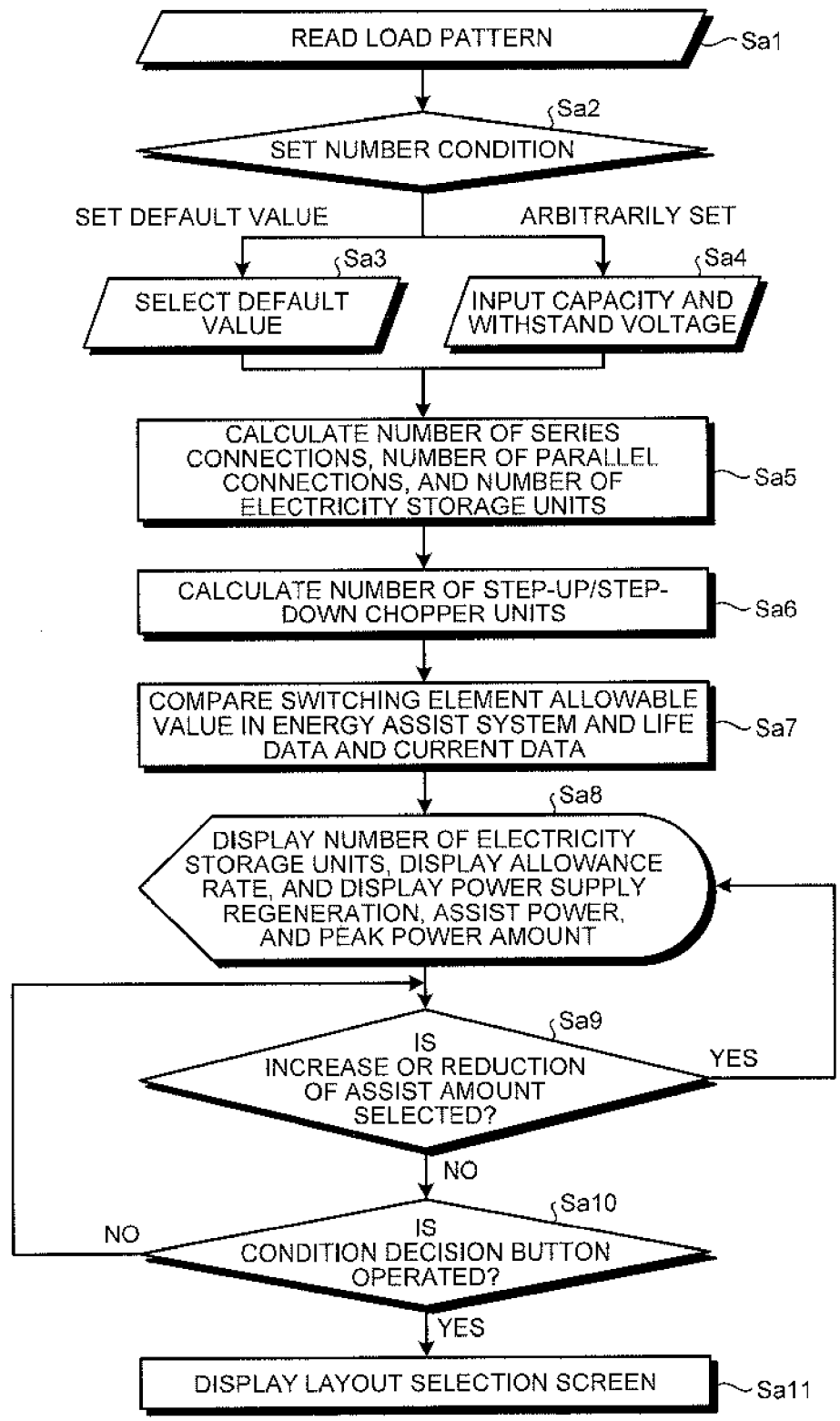
FIG. 11 is a flowchart for explaining the operation of a data processing section in the embodiment.

The operation of the data processing section 30 including a selection function for an electricity storage unit is explained with reference to FIG. 11. FIG. 11 is a flowchart for explaining the operation of the data processing section 30. For example, the data processing section 30 performs processing shown in FIG. 11 in cooperation with the OS 54, the first storing section 51, and the control section 50 (see FIG. 2).

At step Sa1, a load pattern is read. For example, the load pattern is input to the load-pattern input section 31 from the load-pattern generating section 20. The load-pattern input section 31 supplies the load pattern to the charging/discharging-pattern generating section 32 and supplies the load pattern to the condition-setting processing section 33 through the charging/discharging-pattern generating section 32 (or directly).

The charging/discharging-pattern generating section 32 receives the load pattern from the load-pattern input section 31. The charging/discharging-pattern generating section 32 generates a charging/discharging pattern of the electricity storage unit CD (see FIG. 16) according to the load pattern (see FIGS. 9(a) and 9(b)). The charging/discharging pattern includes, for example, time-series patterns of a charging current and a discharging current (associated with time information) with respect to the electricity storage unit CD by the step-up/step-down chopper unit CP. The charging/discharging-pattern generating section 32 supplies the generated charging/discharging pattern to the current-evaluation processing section 34 through the condition-setting processing section 33 (or directly).

At steps Sa2 to Sa6, the condition-setting processing section 33 receives the load pattern from the load-pattern input section 31. The condition-setting processing section 33 sets a number condition according to the load pattern. The number condition is a condition concerning the number of each unit of the energy assist system S and includes, for example, a condition for determining at least one of the number of the step-up/step-down chopper units CP, the number of the electricity storage units CD, and the number of the electric motors M in the energy assist system S. The number condition can further include, for example, a condition for determining the number of the converter units CV and the number of the drive units DV in addition to the condition for determining the step-up/step-down chopper units CP, the number of the electricity storage units CD, and the number of the electric motors M. For example, the setting of the number condition includes condition setting for calculating a necessary number of electricity storage units. The number condition includes, for example, the capacity and the withstand voltage of the electricity storage unit CD. For example, the number condition can be a condition for calculating the limit value used at step Sa1.

For example, at step Sa2, the condition-setting processing section 33 displays, concerning a setting method for a number condition, for example, a message for inquiring whether setting of a default value is performed or arbitrary setting is performed on the display screen 52a and urges the user to select the setting of the default value or the arbitrary setting. Upon receiving an instruction to perform the setting of the default value from the user, the condition-setting processing section 33 advances the processing to step Sa3. Upon receiving an instruction for performing the arbitrary setting from the user, the condition-setting processing section 33 advances the processing to step Sa4.

At step Sa3, the condition-setting processing section 33 selects the default value and sets a number as a condition. In this case, for example, the condition-setting processing section 33 can include a number condition table in which each of a plurality of number conditions, which are candidates of the number condition, are associated with a load pattern. Upon receiving the load pattern, the condition-setting processing section 33 refers to the number condition table and selects a number condition matching the received load pattern. The condition-setting processing section 33 selects, for example, as the number condition, the capacity and the withstand voltage of the electricity storage unit CD corresponding to the received load pattern.

At step Sa4, the condition-setting processing section 33 arbitrarily sets the number condition. For example, the condition-setting processing section 33 can set the number condition by receiving an input of a number condition corresponding to the load pattern (via interactive processing) (see FIG. 10). In this case, for example, upon receiving the load pattern, the condition-setting processing section 33 can display the load pattern on the display screen 52a (see FIG. 2) and display an input space for a number condition on the display screen 52a in a form for urging the user to input the number condition. The condition-setting processing section 33 can set, as a proper number condition, a number condition input from the user. The condition-setting processing section 33 receives, for example, as the number condition, an input of the capacity and the withstand voltage of the electricity storage unit CD and sets the input capacity and withstand voltage as proper capacity and withstand voltage.

Then, the condition-setting processing section 33 can further display a proper numerical value range as the number condition. Consequently, the condition-setting processing section 33 can set, as a proper number condition, the number condition input from the user while urging the user to input the proper number condition.

At step Sa5, the condition-setting processing section 33 calculates an electric current, a voltage, a discharging amount, a power loss, and a heat generation/radiation amount of a capacitor power supply in time series based on data and conditions stored in the program and performs comparison processing for comparing the electric current, voltage, the discharging amount, the power loss, and the heat generation/radiation amount with stored load data, a time-series load pattern, rated specifications of the capacitor power supply, and the like. In the processing, a total number of necessary electricity storage units is calculated according to the following Formulas 5 to 7 from the load pattern (e.g., consumed energy data) read at step Sa1. However, when the number condition is arbitrarily set, the number of electricity storage units is calculated. When the read load pattern [W] is transformed into data of consumed energy E [J], the following Formula 5 is obtained.

$$E = \frac{1}{2} C (V_0^2 - \{V_0 - a\}^2) \quad (5)$$

When a discharging initial voltage of an electricity storage unit is represented as V0 [V] and a voltage use range of the electricity storage unit is represented as a [V], a total capacity value C [F] of the electricity storage unit is determined by the following Formula 6.

$$C = \frac{2E}{(V_0^2 - \{V_0 - a\}^2)} \quad (6)$$

Thereafter, the condition-setting processing section 33 calculates a number n of necessary electricity storage units according to the following Formula 7 by dividing the capacity C in a unit of necessary electricity storage units by an input capacity of the electricity storage unit or a determined electricity storage unit capacity C' per one unit.

$$n = C/C' \quad (7)$$

At step Sa6, the condition-setting processing section 33 compares a maximum load amount and electric energy operable by the step-up/step-down chopper unit and calculates a necessary number of step-up/step-down chopper units.

The condition-setting processing section 33 supplies the set number condition to the current-evaluation processing section 34 and supplies the set number condition to the data adjusting section 35 through the current-evaluation processing section 34 (or directly).

At step Sa7, the current-evaluation processing section 34 receives the charging/discharging pattern from the charging/discharging-pattern generating section 32 and receives the number condition from the condition-setting processing section 33. The current-evaluation processing section 34 calculates an electric current in the energy assist system S according to the charging/discharging pattern and the number condition. The current-evaluation processing section 34 calculates, for example, a current value of a portion easily affected by an electric current and deteriorated in the energy assist system S. For example, the current-evaluation processing section 34 can calculate an electric current flowing through the switching element SW1 in the energy system S, can calculate an electric current flowing through the switching element SW2, or can calculate an electric current flowing through the reactor L2 (see FIG. 16).

The current-evaluation processing section 34 compares the calculated electric current of the energy assist system with a current limit value. For example, the current-evaluation processing section 34 can compare an electric current flowing through the switching element SW1 in the energy assist system S with the current limit value THSW1 for the switching element SW1, can compare an electric current flowing through the switching element SW2 with the current limit value THSW2 for the switching element SW2, or can compare an electric current flowing through the reactor L2 with the current limit value THL2 for the reactor L2. The current-evaluation processing section 34 evaluates characteristics of the energy assist system according to a comparison result. An evaluation result can include information concerning energy in the energy assist system and can include, for example, information concerning assist power and peak power. The current-evaluation processing section 34 supplies the evaluation result to the data adjusting section 35 and supplies the evaluation result to the data-output processing section 36 through the data adjusting section (or directly).

For example, the current-evaluation processing section 34 calculates an electric current flowing through the inside of the electricity storage unit from the calculated consumed power after assist and conditions of the electricity storage unit. The current-evaluation processing section 34 compares data of the electric current flowing through the inside of the electricity storage unit and a current allowable value of the switching element in the step-up/step-down chopper unit. Similarly, the current-evaluation processing section 34 compares a control current value and a control cycle pattern of the step-up/step-down chopper unit and power cycle life data of the switching element owned by the selecting apparatus, calculates a life value of the step-up/step-down chopper unit from an operation pattern, and displays the life value (see FIG. 10).

The data adjusting section 35 receives the evaluation result from the current-evaluation processing section 34 and receives the number condition from the condition-setting processing section 33. The data adjusting section 35 adjusts, according to the evaluation result, the number condition set by the condition-setting processing section 33 and generates configuration information. For example, the data adjusting section 35 calculates, according to the evaluation result, for example, the number of each unit necessary in the energy assist system S. For example, the data adjusting section 35 calculates, for example, the number of each unit necessary in the energy assist system S such that an electric current of the energy assist system fits within the current limit value.

For example, the data adjusting section 35 can calculate, for example, the number of each unit necessary in the energy assist system S such that an electric current flowing through the switching element SW1 in the energy assist system S fits within the current limit value THSW1 for the switching element SW1 (satisfies a first condition). Alternatively, for example, the data adjusting section 35 can calculate, for example, the number of each unit necessary in the energy assist system S such that an electric current flowing through the switching element SW2 fits within the current limit value THSW2 for the switching element SW2 (satisfies a second condition). Alternatively, for example, the data adjusting section 35 can calculate, for example, the number of each unit necessary in the energy assist system S such that an electric current flowing through the reactor L2 fits within the current limit value THL2 for the reactor L2 (satisfies a third condition). Alternatively, for example, the data adjusting section 35 can calculate, for example, the number of each unit necessary in the energy assist system S such that two or more of the first condition, the second condition, and the third condition are satisfied.

The configuration information is information concerning the configuration of the energy assist system and includes, for example, the number of each unit in the energy assist system. The configuration information includes, for example, a necessary number of the electricity storage units CD, a necessary number of the step-up/step-down chopper units CP, and a necessary number of the electric motors M (see FIG. 16). The data adjusting section 35 supplies the generated configuration information to the data-output processing section 36.

At step Sa8, the data-output processing section 36 receives the configuration information from the data adjusting section 35 and receives the evaluation result from the current-evaluation processing section 34. The data-output processing section 36 displays the configuration information and the evaluation result on the display screen 52a. For example, the data-output processing section 36 displays, according to the configuration information and the evaluation result, the configuration information and energy of the energy assist system applied with the configuration information on the display screen 52a. For example, the data-output processing section 36 displays information concerning the number of the electricity storage units CD, assist power, peak power, and the like on the display screen 52a (see FIG. 10).

For example, the data-output processing section 36 displays energy comparison data of the number of electricity storage units, a system allowance rate from a maximum specification, power supply regeneration of the system, assist power, and peak power with those before the system application.

At step Sa9, upon receiving an instruction to visually adjust a condition of an operation pattern according to an increase or a decrease in the peak power and an assist amount with respect to a final output, the data adjusting section 35 adjusts power costs to be reduced and an increase or a decrease in the number of units according to the instruction. When the adjustment is performed ("Yes" at step Sa9), the data adjusting section 35 returns the processing to step Sa8 and supplies the configuration information including the numbers after the adjustment to the data-output processing section 36. Accordingly, the data-output processing section 36 updates, according to the configuration information including the numbers after the adjustment, display contents of the configuration information (step Sa8). On the other hand, for example, when the adjustment is not performed within a predetermined waiting time ("No" at step Sa9), the data adjusting section 35 advances the processing to step Sa10.

At step Sa10, when an instruction is received according to operation of a condition decision button by the user ("Yes" at step Sa10), the data-output processing section 36 supplies the configuration information and the evaluation result to the layout section 40 and advances the processing to step Sa11. On the other hand, when the operation of the condition decision button by the user is not received within the predetermined waiting time ("No" at step Sa10), the data-output processing section 36 returns the processing to step Sa9.

At step Sa11, the layout section 40 starts, based on assist power and the numbers of power units, a layout selection screen (see FIG. 13) for performing adjustment of a layout.

A current pattern, a load pattern, and assist power are explained with reference to FIG. 9. FIG. 9(*a*) is a diagram of the current pattern, FIG. 9(*b*) is a diagram of the load pattern, and FIG. 9(*c*) is a diagram of a result obtained by calculating the assist power with respect to the load pattern.

FIG. 9(*a*) is a diagram of a pattern (a current pattern) of a temporal change of an electric current (e.g., a q-axis current) corresponding to a load in the electric motor M. The current pattern shown in FIG. 9(*a*) is calculated from a torque pattern and the electric motor condition (see FIG. 8) and is, for example, a pattern for each of shafts.

FIG. 9(*b*) is a diagram of a pattern (a load pattern) of a temporal change of electric power corresponding to the load in the electric motor M. The load pattern shown in FIG. 9(*b*) is obtained as a pattern of a temporal change of total power consumption of the energy assist system by calculating shaft outputs of the shafts including a copper loss, an iron loss, and a reluctance torque from the current pattern shown in FIG. 9(*a*) and totaling the calculated shaft outputs of the shafts.

FIG. 9(*c*) is a diagram indicating that electric power of hatched portions is calculated to be assisted by electric energy of the electricity storage unit CD with respect to the load pattern shown in FIG. 9(*b*). For example, as shown in FIG. 9(*c*), the data-output processing section 36 displays assist power in the load pattern on the display screen 52*a* in a distinguishable form (e.g., a form highlighted by the hatched portions or the like). Therefore, the user can check assisted energy (assist power) by checking portions distinguished by the distinguishable form (e.g., portions highlighted by the hatched portions or the like).

The operation energy adjustment screen displayed on the display screen 52*a* at step Sa8 is explained with reference to FIG. 10. FIG. 10 is a diagram of the configuration of the operation energy adjustment screen.

On the operation energy adjustment screen, as shown in FIG. 10, a load pattern (a power pattern) LP is displayed and assist power 86 is displayed as a difference between operation peak power 80 and an assist power line 85 in the load pattern LP.

The operation energy adjustment screen includes, as a configuration for increasing or decreasing assist power, an electricity storage unit number input space 81, an energy assist amount input space 82, a power running assist power line operation bar 83, and an assist power line operation bar 84.

In the electricity storage unit number input space 81, for example, the present calculated number of electricity storage units is displayed. The user can increase or reduce the assist power by, for example, inputting a number increased or reduced from the present number. The data adjusting section 35 can calculate, according to the evaluation result, a candidate (a proper numerical value range) of the number of electricity storage units necessary in the energy assist system S and display the proper numerical value range near the electricity storage unit number input space 81. Consequently, it is possible to urge the user to input a proper number as the number of electricity storage units.

In the energy assist amount input space 82, for example, the present calculated assist amount (assist power) (i.e., an amount of electric power corresponding to the assist power 86) is displayed. The user can increase or reduce the assist power by, for example, inputting an assist amount (assist power) increased or reduced from the present assist amount (assist power). The data adjusting section 35 can calculate an adjustment range (a proper adjustment range) of a proper assist amount (assist power) from the present load pattern LP and display the proper adjustment range near the energy assist amount input space 82. Consequently, it is possible to urge the user to input a proper assist amount (assist power).

The power running assist power line operation bar 83 is a user interface for selectively operating the assist power line 85 during power running without changing the assist power line 85 during regeneration (e.g., while maintaining the assist power line 85 at a level set by the assist power line operation bar 84). For example, when the power running assist power line operation bar 83 is operated to move to the left side, the assist power line 85 is moved to a low-energy side. For example, when the power running assist power line operation bar 83 is operated to move to the right side, the assist power line 85 is moved to a high-energy side. When the assist power line 85 is set to the same level during the regeneration and during the power running, for example, an inactivation button (not shown in the figure) is pressed, whereby the power running assist power line operation bar 83 is changed to an inactive state.

The assist power line operation bar 84 is a user interface for operating the assist power line 85. For example, when the assist power line operation bar 84 is operated to move to the left side, the assist power line 85 is moved to the low-energy side. For example, when the assist power line operation bar 84 is operated to move to the right side, the assist power line 85 is moved to the high-energy side. When the power running assist power line operation bar 83 is activated, the assist power line operation bar 84 functions as a user interface for selectively operating the assist power line 85 during the regeneration. When the power running assist power line operation bar 83 is inactivated, the assist power line operation bar 84 functions as a user interface for operating the common assist power line 85 during the regeneration and during the power running.

For example, the user can adjust the assist power line by moving the power running assist power line operation bar 83 and the assist power line operation bar 84 or can edit the number in the electricity storage unit number input space 81 or the assist amount (the assist power) in the energy assist amount input space 82. Then, on the operation energy adjustment screen, to prevent the characteristics of the energy assist system from exceeding the limit values, an assist amount (assist power) running short can be displayed to be able to be checked.

Figure 12:
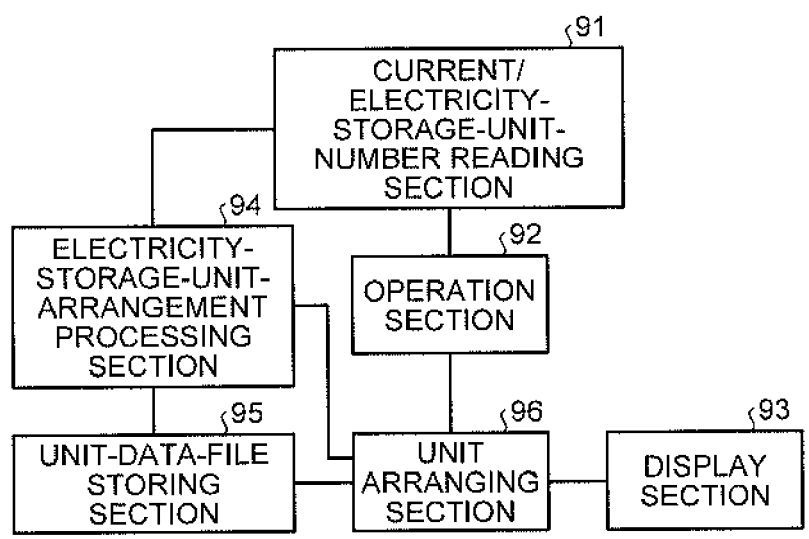
FIG. 12 is a diagram of the configuration of a layout selection tool in the embodiment.

A functional configuration of a layout selection tool corresponding to the layout section 40 is explained with reference to FIG. 12. FIG. 12 is a diagram of the functional configuration of the layout selection tool.

The layout selection tool is executed by the control section 50 (see FIG. 2), whereby the functional configuration shown in FIG. 12 is formed in the energy assist system selection supporting apparatus 1 (e.g., in the work area 51*a* in the first storing section 51). Functional sections formed by the layout selection tool can be collectively formed according to the start of the execution of the layout selection tool or can be sequentially formed according to an execution state of the layout selection tool.

For example, the energy assist system selection supporting apparatus 1 includes, as functional components realized by the layout selection tool, as shown in FIG. 12, a current/electricity-storage-unit-number reading section 91, an operation section 92, a display section 93, an electricity-storage-unit-arrangement processing section 94, a unit-data-file storing section 95, and a unit arranging section 96.

The current/electricity-storage-unit-number reading section 91 reads the number of step-up/step-down chopper units, the number of electricity storage units, and an electric current calculated by the data processing section. That is, configuration information and an evaluation result are input to the current/electricity-storage-unit-number reading section 91 from the data-output processing section 36. That is, the current/electricity-storage-unit-number reading section 91 corresponds to the layout input section 41 (see FIG. 1).

The operation section 92 is configured by a keyboard, a mouse, and the like and performs input control for receiving operation from the user. That is, the operation section 92 corresponds to a section in the layout arranging section 42 for performing input control for receiving a layout instruction from the user.

The display section 93 displays a result of the arrangement in the layout arranging section 42 and performs display on a display, a printer, and the like. That is, the display section 93 corresponds to a section in the layout arranging section 42 for performing display control for displaying, on the display screen 52a, display objects laid out and arranged according to a layout instruction and corresponds to a section in the layout output section 44 for performing display control for displaying a warning according to an evaluation result.

For example, the electricity-storage-unit-arrangement processing section 94 compares, based on data read by the current/electricity-storage-unit-number reading section 91, the number of parallel connections of electricity storage units arranged by the user and a unit limit value (a layout limit value) for allowing an assist operation and determines whether the number of parallel connection does not exceed the unit limit value. That is, the electricity-storage-unit-arrangement processing section 94 evaluates layout information and the layout limit value while comparing the layout information and the layout limit value and corresponds to the layout evaluation section 43.

The unit-data-file storing section 95 stores information concerning a converter unit, a drive unit, an electricity storage unit, a motor, a cable, and a step-up/step-down chopper unit and transmits the information to the unit arranging section 96. The unit-data-file storing section 95 corresponds to a section in each of the layout arranging section 42, the layout evaluating section 43, and the layout output section 44 for temporarily storing information.

The unit arranging section 96 transmits the layout information to the display section 93 based on the information of the operation section 92 and the unit-data-file storing section 95. That is, the unit arranging section 96 displays the layout information on the display screen 52a via the display section 93 and corresponds to a section in the layout arranging section 42 for performing display control for displaying, on the display screen 52a, the display objects laid out and arranged according to a layout instruction in the layout arranging section 42.

The layout selection screen displayed on the display screen 52a by the layout section 40 is explained with reference to FIG. 13.

Figure 13:
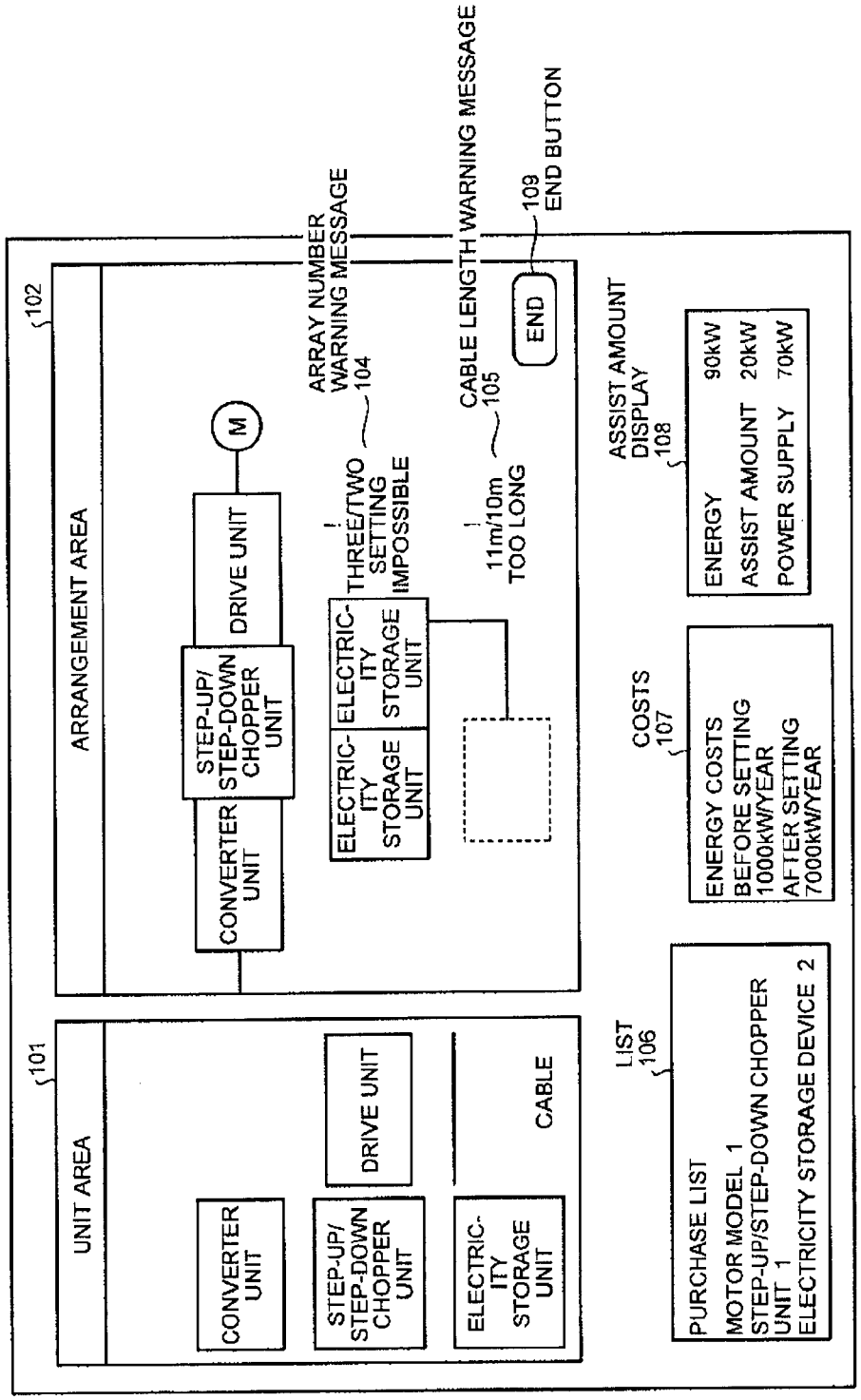
FIG. 13 is a diagram of the configuration of a layout selection screen in the embodiment.

The layout selection screen includes, as shown in FIG. 13, a unit area 101, an arrangement area 102, a list area 106, a cost area 107, and an assist amount display area 108.

In the unit area 101, in an initial state, display objects of units provided in a number corresponding to configuration information are displayed. In FIG. 13, a state in which a converter unit, a step-up/step-down chopper unit, a drive unit, an electricity storage unit, and a cable are displayed in the unit area 101 is shown.

The arrangement area 102 represents a virtual space corresponding to a space in a control board in which the units should actually be arranged. The user selects units from the unit area 101 and arranges the units in the arrangement area 102. At this time, the user arranges the units while determining, with the electricity-storage-unit-arrangement processing section 94 (or the layout evaluation section 43 shown in FIG. 1), whether the number of parallel connections of electricity storage units is equal to or larger than a default value. When the number of parallel connections of electricity storage units exceeds the default value, a warning section 104 performs a warning. The warning section 104 performs the warning by, for example, displaying a warning message on the display screen 52a.

For example, in FIG. 13, a state in which one converter unit, one step-up/step-down chopper unit, and one drive unit are arranged in the arrangement area 102 and two electricity storage units are arranged in the arrangement area 102 is shown. At this time, when an electricity storage unit is further added as indicated by a broken line, it is determined that the number of parallel connections (three) of the electricity storage units exceeds the default value (two), and a warning by the warning section 104 is performed.

For example, in FIG. 13, a state in which one converter unit, one step-up/step-down chopper unit, and one drive unit are arranged in the arrangement area 102 and two electricity storage units are arranged in the arrangement area 102 is shown. Then, when an electricity storage unit to be added is connected to the two electricity storage units via an 11 m cable as indicated by a solid line, it is determined that the length of the cable (11 m) exceeds a default value (10 m), and a warning by a warning section 105 is performed.

In the list area 106, a purchase list corresponding to the units present on the arrangement area 102 is displayed. For example, when an end button 109 is pressed, a purchase list listing the units present on the arrangement area 102 is created and the created purchase list is displayed on the list area 106. For example, the purchase list can be dynamically updated and displayed on the list area 106 every time a unit is additionally arranged on the arrangement area 102.

In the cost area 107, energy costs corresponding to the units present on the arrangement area 102 are displayed. For example, when the end button 109 is pressed, energy costs before and after setting of the units present on the arrangement area 102 are calculated. The calculated energy costs before and after the setting of the units are displayed for comparison on the cost area 107.

For example, the energy costs can be dynamically updated and displayed on the cost area 107 every time a unit is additionally arranged on the arrangement area 102. In this case, when the end button 109 is pressed, the energy costs are decided.

In the assist amount display area 108, an assist amount (assist power) corresponding to the units present on the arrangement area 102 is displayed. For example, when the end button 109 is pressed, an assist amount corresponding to the units present on the arrangement area 102 is calculated. The calculated assist amount is displayed on the assist amount display area 108 (e.g., together with necessary power (energy) and power supply power).

For example, the assist amount can be dynamically updated and displayed on the assist amount display area 108 every time a unit is additionally arranged on the arrangement area 102. In this case, when the end button 109 is pressed, the assist amount is decided.

Figure 14:
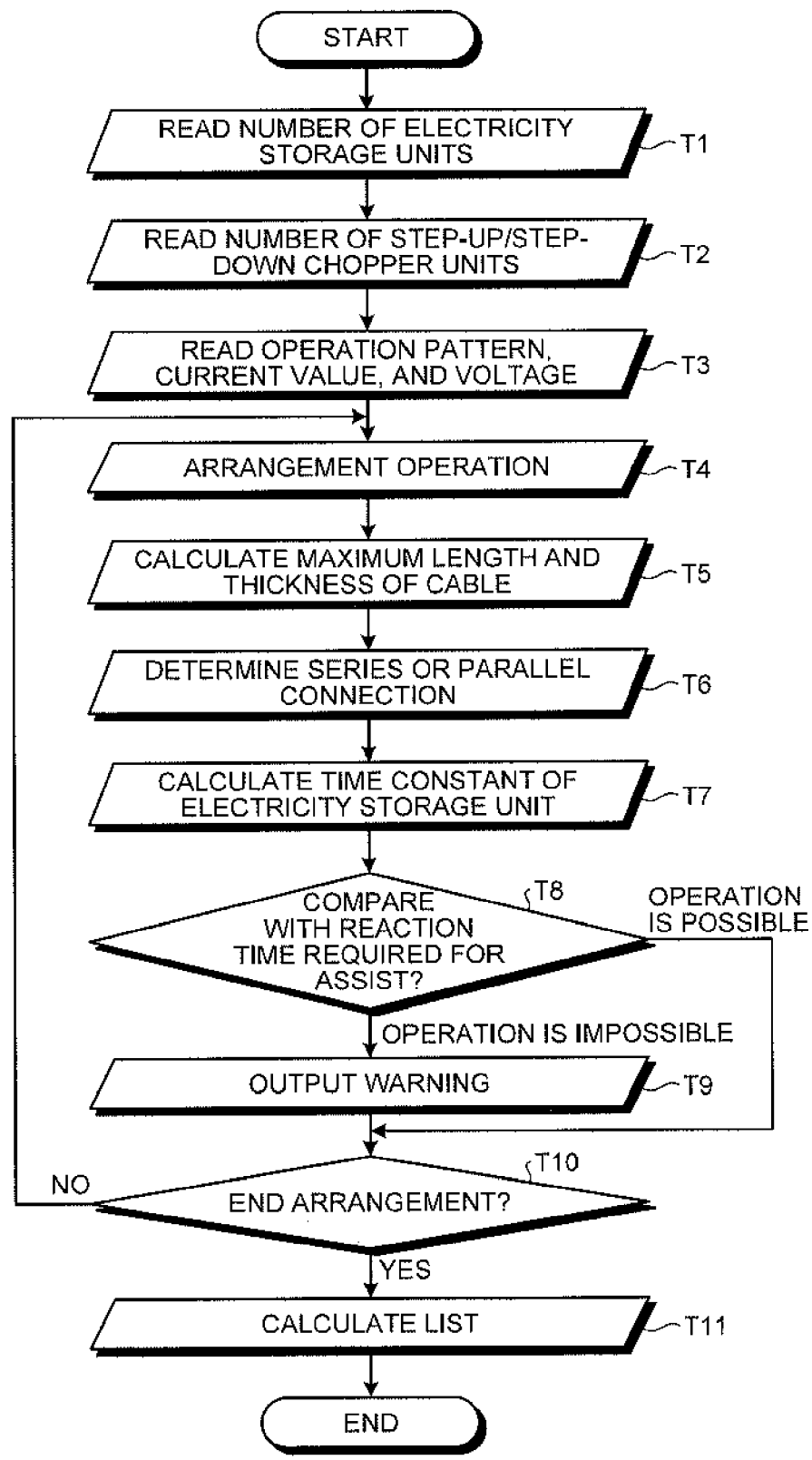
FIG. 14 is a flowchart for explaining the operation of a layout section in the embodiment.

The operation of the layout section 40 is explained with reference to FIG. 14. FIG. 14 is a flowchart for explaining the operation of the layout section 40.

At steps T1 to T3, configuration information and an evaluation result are input to the layout input section 41 from the data-output processing section 36. The layout input section 41 supplies the configuration information and the evaluation result to the layout arranging section 42. When requested from the layout output section 44, the layout input section 41 supplies the configuration information to the layout output section 44 through the layout arranging section 42 and the layout evaluating section 43 (or directly).

At step T1, as the configuration information, for example, the number of arrangeable electricity storage units is read into the layout input section 41.

At step T2, as the configuration information, for example, the number of step-up/step-down chopper units is read into the layout input section 41.

At step T3, as the evaluation result, for example, an operation pattern, a current value, and a voltage are read into the layout input section 41.

At step T4, the layout arranging section 42 receives the configuration information and the evaluation result from the layout input section 41. The layout arranging section 42 displays, according to the evaluation result, information concerning energy (e.g., data of an electric current and electric power) of the energy assist system applied with the configuration information on the display screen 52*a*. The user executes operation of layout arrangement via the layout selection screen shown in FIG. 13. The layout arranging section 42 lays out and arranges, according to the configuration information and an instruction from the user, display objects indicating the units of the energy assist system on the display screen 52*a*.

For example, the layout arranging section 42 can lay out and arrange, according to the configuration information, the display objects indicating the units of the energy assist system in a default position (e.g., the unit area 101 shown in FIG. 13) on the display screen 52*a*. The layout arranging section 42 changes the positions of the display objects on the display screen 52*a* according to an instruction from the user. For example, the layout arranging section 42 receives drag-and-drop operation from the user via an input interface such as a mouse pointer or a touch panel and changes the positions of the display objects on the display screen 52*a* according to the drag-and-drop operation. That is, the layout arranging section 42 can change the positions of the display objects on the display screen 52*a* to desired positions in a virtual space (e.g., the arrangement area 102 shown in FIG. 13) corresponding to a space in an actual control board. Consequently, the user can examine the arrangement concerning the units in the energy assist system using the layout arranging section 42.

After performing the layout arrangement, the layout arranging section 42 supplies layout information to the layout evaluating section 43. The layout information is information concerning the positions of the display objects indicating the laid-out and arranged units on the display screen 52*a* and is information in which an identifier of a unit, an identifier of a display object, and a position (a coordinate) of arrangement on the display screen 52*a* are associated concerning a plurality of units. For example, the layout arranging section 42 updates the layout information and supplies the updated layout information to the layout evaluating section 43 every time the layout arrangement is changed.

At steps T5 to T8, the layout evaluating section 43 receives the layout information from the layout arranging section 42. The layout evaluating section 43 evaluates the layout information while comparing the layout information with a layout limit value. For example, the layout limit value can include a limit value concerning electrical possibility of a layout arrangement or can include a limit value concerning physical possibility of, for example, dimensions of the units. For example, the layout evaluating section 43 compares the number of parallel connections of arrangeable electricity storage units determined from a charging and discharging time constant due to impedance and a charging/discharging pattern and the number of parallel connections of electricity storage units arranged by the user to thereby determine whether the number of parallel connections of the electricity storage units arranged by the user is within an allowable range. The layout evaluating section 43 can set a result of the determination as an evaluation result for the layout information. The layout evaluating section 43 supplies the evaluation result to the layout output section 44.

For example, at step T5, the layout evaluating section 43 determines, according to the current value read at step T3, a sectional dimension of a member required for a cable wire. The layout evaluating section 43 determines, according to the calculated sectional dimension, a limit value of a cable length from a database of maximum lengths of cables included in this layout generating apparatus. Then, when the length of a cable arranged by the user exceeds a default specification value, the layout evaluating section 43 displays, with the warning section 105, for example, a warning message for the cable length on the display screen 52*a* (see FIG. 13).

At step T6, when an electricity storage unit is arranged, the layout evaluating section 43 determines whether the electricity storage unit is connected in series or in parallel.

Figure 15:
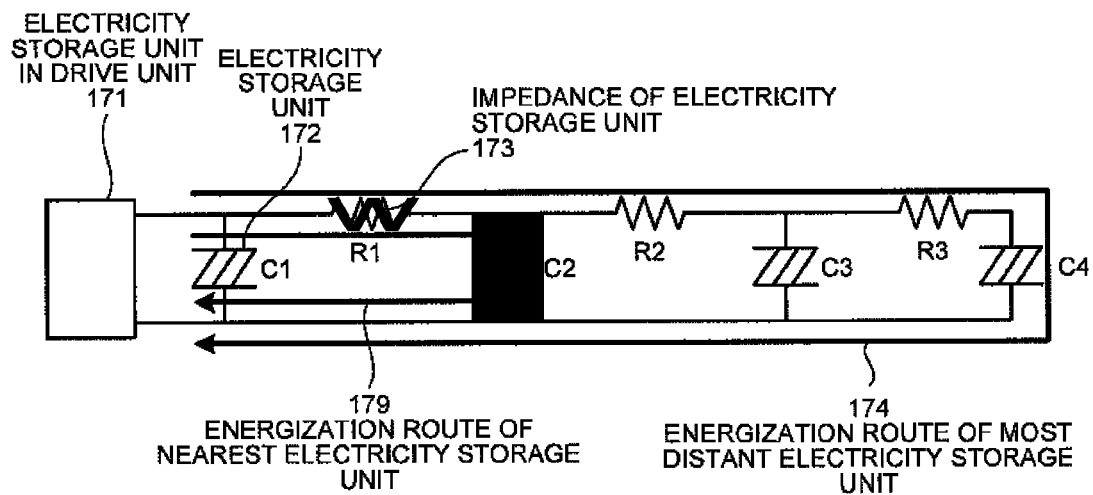
FIG. 15 is a diagram for explaining a warning operation of the layout section in the embodiment.

At step T7, the layout evaluating section 43 calculates, from the number of parallel connections and the number of series connections of the electricity storage units, a time constant $\tau$ represented by C, R, and L related to charging and discharging of the electricity storage units. A conceptual diagram of a formula is shown in FIG. 15. For example, as shown in FIG. 15, capacitive elements C1, C2, C3, and C4 are connected in parallel to an electricity storage section 171 in the drive unit DV. A resistor R is connected between the capacitive element C1 and the capacitive element C2. A resistor R2 is connected between the capacitive element C2 and the capacitive element C3. A resistor R3 is connected between the capacitive element C3 and the capacitive element C4. This configuration is examined. In this configuration, (combined resistance)×(combined capacity) is considered to be approximately proportional to a difference between the impedance of an energization route 179 of a nearest electricity storage unit and the impedance of an energization route 174 of a most distant electricity storage unit. Therefore, the layout evaluating section 43 calculates a difference between the impedance of the energization route 179 of the nearest electricity storage unit and the impedance of the energization route 174 of the most distant electricity storage unit and calculates the time constant $\tau$ according to the calculated difference (e.g., by multiplying the calculated difference with a predetermined coefficient).

At step T8, the layout evaluating section 43 compares the time constant of the electricity storage units calculated at step T7 and a control response time α required for an assist of the step-up-step-down chopper units and determines whether an assist operation is possible.

For example, as indicated by the following Formula 8, the layout evaluating section 43 compares a calculation period (the control response time) α concerning an assist of the step-up/step-down chopper units and the time constant τ obtained when the electricity storage units are connected in parallel and determines whether control is possible. When the time constant τ is smaller than the control response time α, an assist energy amount obtained by totaling energy that all the electricity storage units can store is considered to exceed a shortage in an energy amount of an operation pattern. Therefore, the layout evaluating section 43 determines that the assist operation is possible. On the other hand, when the time constant τ is equal to or larger than the control response time α, the assist energy amount obtained by totaling energy that all the electricity storage units can store is considered to be smaller than a shortage in an energy amount of an operation pattern. Therefore, the layout evaluating section 43 determines that the assist operation is impossible. When the assist operation is possible ("operation is possible" at step T8), the layout evaluating section 43 advances the processing to step T10.

$$\alpha > \tau \quad (8)$$

On the other hand, when the assist operation is impossible ("operation is impossible" at step T8), the layout evaluating section 43 advances the processing to step T9.

At step T9, the layout output section 44 outputs a warning according to an evaluation result. For example, when layout information deviates from an allowable range corresponding to a layout limit value, the layout output section 44 outputs a warning. For example, when the number of parallel connections of electricity storage units arranged by the user is outside the allowable range, the layout output section 44 outputs a warning. As a method of outputting a warning, a visual method for, for example, displaying a warning message on the display screen 52a or flashing an alarm lamp can be used or an auditory method for, for example, outputting a warning message by sound from the sound output section 49 or outputting an alarm buzzer from the sound output section 49 can be used. Consequently, it is possible to urge the user to reexamine the arrangement concerning the units using the layout arranging section 42. For example, the user can perform correction for a limit value by changing the number of parallel connections according to the warning.

At step T10, when an instruction for an arrangement end is received from the user, the layout output section 44 advances the processing to step T11. When the instruction for an arrangement end is not received within a predetermined waiting time, the layout output section 44 returns the processing to step T4.

At step T11, the layout output section 44 generates, for example, a list of the number of each unit according to the configuration information and supplies the list to the output section 15. The list of the number of each unit is, for example, a list in which an identifier of a unit and the number of units are associated concerning each of a plurality of units (see FIG. 13).

As explained above, in the embodiment, in the energy assist system selection supporting apparatus 1, the operation-pattern generating section 10 generates an operation pattern taking into account an electronic machine configuration. The load-pattern generating section 20 generates a load pattern concerning power consumption according to the operation pattern generated by the operation-pattern generating section 10. The data processing section 30 evaluates, according to the load pattern generated by the load-pattern generating section 20, characteristics of an energy assist system applied with the operation pattern generated by the operation-pattern generating section 10 while comparing the characteristics with limit values. The data processing section 30 generates, according to a result of the evaluation, configuration information including the numbers of units of the energy assist system. Consequently, it is possible to easily select the number of each unit of the energy assist system such that the characteristics of the energy assist system fit within allowable ranges corresponding to the limit values. The layout section 40 lays out and arranges, according to the configuration information generated by the data processing section 30, the units of the energy assist system on a virtual space and displays the units on the display screen 52a. Consequently, it is possible to examine and easily select a layout of the energy assist system beforehand such that a layout of the units of the energy assist system fits within an allowable range corresponding to a layout limit value. Therefore, it is possible to support the selection of the energy assist system with simple and efficient processing.

In the embodiment, in the energy assist system selection supporting apparatus 1, the electronic-machine arranging section 11 arranges electronic machines and generates electronic machine conditions. The operation-program describing section 12 describes an operation program. The operation-pattern generating section 13 generates an operation pattern according to the electronic machine conditions generated by the electronic-machine arranging section 11 and the operation program described by the operation-program describing section 12. Consequently, it is possible to generate an operation pattern taking into account the electronic machine configuration.

Alternatively, in the embodiment, the operation-pattern generating section 13 imports simulation data created by the user (e.g., a result obtained by simulating a complicated operation pattern of a cam operation of a plurality of shafts, a gear, and the like) from simulation software and converts the imported simulation data into a format processable by the load-pattern generating section 20 to generate an operation pattern. Consequently, it is unnecessary to perform a complicated manual calculation using machine mechanism simulation software created by the user consuming an enormous time. It is possible to directly calculate energy data based on the operation pattern. That is, there is an effect that it is possible to calculate an assist amount of the operation pattern in complicated and plural shafts under conditions close to actual conditions by associating with a complicated operation pattern, which is created by the user beforehand using the simulation software, and inputting machine conditions.

In the embodiment, in the energy assist system selection supporting apparatus 1, actual machine conditions are input to the machine-condition input section 22. The electric-motor-condition selecting section 23 selects an electric motor condition according to the operation pattern generated by the operation-pattern generating section 10 and the actual machine conditions input to the machine-condition input section 22. The torque-pattern calculating section 24 calculates a torque pattern according to the operation pattern generated by the operation-pattern generating section 10 and the electric motor condition selected by the electric-motor-condition selecting section 23. The power-consumption processing section 25 calculates total power consumption and calculates a load pattern according to the operation pattern generated by the operation-pattern generating section 10, the electric motor condition selected by the electric-motor-condition selecting section 23, and the torque pattern calculated by the torque-pattern calculating section 24. Consequently, it is possible to generate a load pattern concerning power consumption according to the operation pattern generated by the operation-pattern generating section 10. Further, it is possible to easily recalculate a load pattern with respect to a change in the operation pattern.

In the embodiment, in the energy assist system selection supporting apparatus 1, the condition-setting processing section 33 sets a number condition concerning the number of each unit of the energy assist system according to the load pattern calculated by the load-pattern generating section 20. The current-evaluation processing section 34 compares an electric current of the energy assist system corresponding to the number condition set by the condition-setting processing section 33 with a current limit value and evaluates characteristics of the energy assist system. The data adjusting section 35 adjusts, according to an evaluation result by the current-evaluation processing section 34, the number condition set by the condition-setting processing section 33 and generates configuration information. Consequently, it is possible to evaluate, according to the load pattern generated by the load-pattern generating section 20, the characteristics of the energy assist system applied with the operation pattern generated by the operation-pattern generating section 10 while comparing the characteristics with the limit values. It is possible to generate, according to an evaluation result, configuration information including the number of each unit of the energy assist system. Further, it is possible to easily recalculate the configuration information with respect to a change in the operation pattern.

In the embodiment, in the energy assist system selection supporting apparatus 1, the layout arranging section 42 lays out and arranges, according to the configuration information and an instruction from the user, the display objects indicating the units of the energy assist system on the display screen 52a and generates layout information concerning the positions of the display objects indicating the units on the display screen 52a. The layout evaluating section 43 evaluates the layout information while comparing the layout information with a layout limit value. The layout output section 44 outputs a warning or outputs the layout information according to an evaluation result by the layout evaluating section 43. Consequently, it is possible to lay out and arrange, according to the configuration information generated by the data processing section 30, the units of the energy assist system on a virtual space and display the units on the display screen and calculate, for example, a necessary number of units, a cable length, and an arrangement plan. Therefore, in examination of an actual control board by the user, it is possible to examine a layout of the energy assist system beforehand.

In the embodiment, in the capacity selecting apparatus 2 (see FIG. 1), the electronic-machine arranging section 11 arranges electronic machines corresponding to a machine that should be driven by the electronic motor and generates electronic machine conditions. The operation-program describing section 12 describes an operation program. The operation-pattern generating section 13 generates an operation pattern according to the electronic machine conditions generated by the electronic-machine arranging section 11 and the operation program described by the operation-program describing section 12. Actual machine conditions are input to the machine-condition input section 22. The electric-motor-condition selecting section 23 selects, according to the operation pattern generated by the operation-pattern generating section 13 and the actual machine conditions input to the machine-condition input section 22, an electric motor condition such that the capacity of the electric motor can be selected. Consequently, it is possible to easily select the capacity of the electric motor corresponding to the machine that should be driven by the electric motor. As a result, for example, it is easy to select the capacity of the electric motor such that the characteristics of the energy assist system fit within allowable ranges corresponding to the limit values.

In the embodiment, in the power-consumption calculating apparatus 3 (see FIG. 1), actual machine conditions are input to the machine-condition input section 22. The electric-motor-condition selecting section 23 selects an electric motor condition according to the operation pattern generated by the operation-pattern generating section 10 and the actual machine conditions input to the machine-condition input section 22. The torque-pattern calculating section 24 calculate a torque pattern according to the operation pattern generated by the operation-pattern generating section 10 and the electric motor condition selected by the electric-motor-condition selecting section 23. The power-consumption processing section 25 calculates a shaft output including a copper loss, an iron loss, and reluctance torque according to the operation pattern generated by the operation-pattern generating section 10, the electric motor condition selected by the electric-motor-condition selecting section 23, and the torque pattern calculated by the torque-pattern calculating section 24 and calculates total power consumption of the energy assist system from the calculated shaft output. Consequently, it is possible to calculate, beforehand, total power consumption of the energy assist system corresponding to the operation of the machine that should be driven by the electric motor. As a result, for example, it is easy to support in selecting the energy assist system such that the characteristics of the energy assist system fit within allowable ranges corresponding to the limit values.

In the embodiment, in the layout generating apparatus 4 (see FIG. 1), the layout arranging section 42 lays out and arranges, according to the configuration information including the number of each unit of the energy assist system and an instruction from the user, display objects indicating the units of the energy assist system on the display screen and generates layout information concerning the positions of the display objects indicating the laid-out and arranged units on the display screen. The layout evaluating section 43 compares the number of parallel connections of arrangeable electricity storage units determined from a charging and discharging time constant due to impedance and a charging/discharging pattern and the number of parallel connections of electricity storage units indicated by the layout information to thereby determine whether the number of parallel connections of the electricity storage units indicated by the layout information is within an allowable range. When the number of parallel connections of the electricity storage units indicated by the layout information is outside the allowable range, the layout output section 44 outputs a warning. When the number of parallel connections of the electricity storage units indicated by the layout information is within the allowable range, the layout output section 44 outputs the layout information. Consequently, when a layout arrangement of the units of the energy assist system is examined according to the configuration information, it is possible to easily specify a layout arrangement in which the number of parallel connections of the electricity storage units is within the allowable range. As a result, it is possible to easily support in selecting a layout of the energy assist system such that a layout of the units of the energy assist system fits within an allowable range corresponding to the layout limit value. If a list of set units is created and output as the layout information, it is possible to help a purchase of units.

In the embodiment, since an energy cost reduction amount estimated to be attained, a necessary number of electricity storage device and necessary conditions, and an assist amount are disposed on the operation energy adjustment screen (see FIG. 10), it is possible to quantitatively evaluate, beforehand, a result of investment in the energy assist system. Therefore, it is easy to launch on investment of fund.

In the embodiment, on the operation energy adjustment screen (see FIG. 10), a load pattern (a power pattern) and assist power are displayed and a user interface for increasing or reducing an assist amount (assist power) is displayed. Therefore, it is possible to intuitively adjust the assist amount and the operation pattern while visually checking the assist power. For example, when three electricity storage units are necessary under the present circumstances but the necessary number of the electricity storage units can be reduced simply by finely adjusting the assist amount, it is possible to easily adjust the assist amount with a slide bar or the like.

In the embodiment, the layout information is generated by laying out and arranging, on the layout selection screen (see FIG. 13), the display objects indicating the units on the virtual space (the arrangement area 102) corresponding to the space in the control board in which the units should be actually arranged. Consequently, it is possible to intuitively examine a layout arrangement while visually checking the positions of the units. As a result, for example, it is possible to reduce overlooking of cable and capacitor arrangement conditions while taking notice of points to note concerning necessary members and a board layout.

INDUSTRIAL APPLICABILITY

As explained above, the energy assist system selection supporting apparatus according to the present invention is useful for selection of an energy assist system.

REFERENCE SIGNS LIST

1 Energy assist system selection supporting apparatus
2 Capacity selecting apparatus
3 Power consumption calculating apparatus
4 Layout generating apparatus
10 Operation-pattern generating section
20 Load-pattern generating section
30 Data processing section
40 Layout section

The invention claimed is:

1. An energy assist system selection supporting apparatus that supports selection of an energy assist system including a step-up/step-down chopper unit, an electricity storage unit, and an electric motor and configured to drive a machine, the energy assist system selection supporting apparatus comprising:
   an operation-pattern generating section configured to generate an operation pattern taking into account an electronic machine configuration;
   a load-pattern generating section configured to generate a load pattern concerning power consumption according to the generated operation pattern;
   a data processing section configured to evaluate, according to the generated load pattern, a characteristic of the energy assist system applied with the generated operation pattern while comparing the characteristic with a limit value and generate, according to an evaluation result, configuration information including the number of each of the units of the energy assist system; and
   a layout section configured to lay out and arrange the units of the energy assist system on a virtual space and display the units on a display screen according to the generated configuration information.

2. The energy assist system selection supporting apparatus according to claim 1, wherein the operation-pattern generating section includes:
   an electronic-machine arranging section configured to arrange an electronic machine and generate an electronic machine condition;
   a describing section configured to describe an operation program; and
   a generating section configured to generate an operation pattern according to the generated electronic machine condition and the described operation program.

3. The energy assist system selection supporting apparatus according to claim 1, wherein the load-pattern generating section includes:
   a machine-condition input section to which an actual machine condition is input;
   a condition selecting section configured to select an electric motor condition according to the generated operation pattern and the input actual machine condition;
   a calculating section configured to calculate a torque pattern according to the generated operation pattern and the selected electric motor condition; and
   a processing section configured to calculate total power consumption and calculate a load pattern according to the generated operation pattern, the selected electric motor condition, and the calculated torque pattern.

4. The energy assist system selection supporting apparatus according to claim 1, wherein the data processing section includes:
   a condition-setting processing section configured to set a number condition concerning the number of each of the units of the energy assist system according to the calculated load pattern;
   an evaluation processing section configured to compare an electric current of the energy assist system corresponding to the set number condition with a current limit value and evaluate the characteristic of the energy assist system; and
   a data adjusting section configured to adjust the set number condition according to an evaluation result by the evaluation processing section and generate the configuration information.

5. The energy assist system selection supporting apparatus according to claim 1, wherein the layout section includes:
   a layout arranging section configured to lay out and arrange, according to the configuration information and an instruction from the user, display objects indicating the units of the energy assist system on the display screen and generate layout information concerning positions of the display objects indicating the units on the display screen;
   a layout evaluating section configured to evaluate the layout information while comparing the layout information with a layout limit value; and
   a layout output section configured to output a warning or output the layout information according to an evaluation result by the layout evaluating section.

6. A capacity selecting apparatus that supports selection of a capacity of an electric motor in an energy assist system including a step-up/step-down chopper unit, an electricity storage unit, and an electric motor and configured to drive a machine, the capacity selecting apparatus comprising:

an electronic-machine arranging section configured to arrange an electronic machine that should be driven by a singularity or more of the electric motors and generate an electronic machine condition;

a describing section configured to describe an operation program;

a generating section configured to generate an operation pattern according to the generated electronic machine condition and the described operation program;

a machine-condition input section to which an actual machine condition is input; and a condition selecting section configured to select an electric motor condition according to the generated operation pattern and the input actual machine condition such that a capacity of the one or more electric motors can be selected.

7. A power consumption calculating apparatus that calculates total power consumption of an energy assist system including a step-up/step-down chopper unit, an electricity storage unit, and an electric motor and configured to drive a machine, the power consumption calculating apparatus comprising:

a machine-condition input section to which an actual machine condition is input;

a condition selecting section configured to select an electric motor condition according to the generated operation pattern and the input actual machine condition;

a calculating section configured to calculate a torque pattern according to the generated operation pattern and the selected electric motor condition; and a processing section configured to calculate a shaft output including a copper loss, an iron loss, and reluctance torque according to the generated operation pattern, the selected electric motor condition, and the calculated torque pattern and calculate total power consumption of the energy assist system from the calculated shaft output.

8. A layout generating apparatus that generates layout information of units in an energy assist system including a step-up/step-down chopper unit, an electricity storage unit, and an electric motor and configured to drive a machine, the layout generating apparatus comprising:

a layout arranging section configured to lay out and arrange, according to configuration information including the number of each of the units of the energy assist system and an instruction from the user, display objects indicating the units of the energy assist system on a display screen and generate layout information concerning positions of the display objects indicating the laid-out and arranged units on the display screen;

a layout evaluating section configured to compares the number of parallel connections of arrangeable electricity storage units determined from a charging/discharging time constant due to impedance and a charging/discharging pattern and the number of parallel connections of electricity storage units indicated by the layout information to thereby determine whether the number of parallel connections of the electricity storage units indicated by the layout information is within an allowable range; and a layout output section configured to output a warning when the number of parallel connections of the electricity storage units indicated by the layout information is outside the allowable range and output the layout information when the number of parallel connections of the electricity storage units indicated by the layout information is within the allowable range.

* * * * *